(12) United States Patent
Tsutsumi

(10) Patent No.: US 9,489,100 B2
(45) Date of Patent: Nov. 8, 2016

(54) POINTER DETECTION SENSOR AND POINTER DETECTION APPARATUS

(71) Applicant: Wacom Co., Ltd., Saitama (JP)

(72) Inventor: Yuji Tsutsumi, Hiroshima (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 15/042,035

(22) Filed: Feb. 11, 2016

(65) Prior Publication Data

US 2016/0239125 A1 Aug. 18, 2016

Related U.S. Application Data

(63) Continuation of application No. PCT/JP2014/071201, filed on Aug. 11, 2014.

(30) Foreign Application Priority Data

Aug. 16, 2013 (JP) .................................. 2013-169094

(51) Int. Cl.
*G06F 3/044* (2006.01)
*G06F 3/041* (2006.01)

(52) U.S. Cl.
CPC ............. *G06F 3/044* (2013.01); *G06F 3/0414* (2013.01); *G06F 3/0416* (2013.01); *G06F 2203/04105* (2013.01); *G06F 2203/04106* (2013.01); *G06F 2203/04111* (2013.01)

(58) Field of Classification Search
CPC .... G06F 3/044; G06F 3/0414; G06F 3/0416; G06F 2203/04106; G06F 2203/04111
See application file for complete search history.

(56) References Cited

U.S. PATENT DOCUMENTS 5,357,266 A * 10/1994 Tagawa ................. G06F 3/0412
345/104
5,942,733 A 8/1999 Allen et al.
(Continued)

FOREIGN PATENT DOCUMENTS

EP 2 434 379 A2 3/2012
EP 2 544 081 A2 1/2013
(Continued)

OTHER PUBLICATIONS

International Search Report, mailed Oct. 28, 2014, issued in corresponding International Application No. PCT/JP2014/071201, filed Aug. 11, 2014, 1 page.
(Continued)

*Primary Examiner* — Ariel Balaoing
(74) *Attorney, Agent, or Firm* — Seed IP Law Group LLP

(57) ABSTRACT

A plurality of first conductors and a plurality of second conductors disposed in first and second directions crossing with each other are disposed in an opposing relationship to each other and in a spaced relationship by a determined distance from each other, and a variation of a capacitance formed between any of the first conductors and any of the second conductors based on a variation of a distance between the first conductor and the second conductor when one of the first conductor and the second conductor is deflected by pressing by a pointer is detected to detect a position pointed to by the pointer. A spacer is disposed between the first and second conductors in a region of a cross point such that a deflection amount of one of the first conductor and the second conductor by the pressing by the pointer has a value higher in a region other than the region of the cross point than in the region of the cross point at which the first conductor and the second conductor cross and overlap with each other.

16 Claims, 22 Drawing Sheets

(56) References Cited

U.S. PATENT DOCUMENTS

| | | |
|---|---|---|
| 9,000,780 B2 | 4/2015 | Fukushima |
| 2003/0234769 A1 | 12/2003 | Cross et al. |
| 2005/0280634 A1* | 12/2005 | Tanabe .................. G06F 3/041 |
| | | 345/173 |
| 2006/0103632 A1* | 5/2006 | Bourdelais ............ G06F 3/045 |
| | | 345/173 |
| 2008/0143691 A1 | 6/2008 | T. Cook |
| 2008/0165139 A1 | 7/2008 | Hotelling et al. |
| 2009/0167721 A1 | 7/2009 | Hamm et al. |
| 2010/0141591 A1 | 6/2010 | Lin |
| 2010/0230181 A1 | 9/2010 | Suzuki |
| 2010/0253651 A1 | 10/2010 | Day |
| 2010/0282000 A1 | 11/2010 | Gorjanc et al. |
| 2010/0300862 A1* | 12/2010 | Tamura ................ G06F 3/0412 |
| | | 200/600 |
| 2010/0308844 A1 | 12/2010 | Day et al. |
| 2011/0001708 A1 | 1/2011 | Sleeman |
| 2011/0007013 A1 | 1/2011 | Shoji |
| 2011/0037713 A1 | 2/2011 | Chen et al. |
| 2011/0074701 A1 | 3/2011 | Dickinson et al. |
| 2011/0234508 A1 | 9/2011 | Oda et al. |
| 2012/0013573 A1 | 1/2012 | Liu et al. |
| 2012/0050215 A1 | 3/2012 | Kim et al. |
| 2012/0086659 A1 | 4/2012 | Perlin et al. |
| 2012/0206349 A1 | 8/2012 | Nowatzyk et al. |
| 2012/0237140 A1 | 9/2012 | Lapstun et al. |
| 2012/0256876 A1 | 10/2012 | Yeh et al. |
| 2012/0268411 A1 | 10/2012 | Chen et al. |
| 2012/0331546 A1 | 12/2012 | Falkenburg et al. |
| 2013/0009653 A1* | 1/2013 | Fukushima ............. G06F 3/044 |
| | | 324/679 |
| 2013/0050151 A1 | 2/2013 | Tu et al. |
| 2014/0111447 A1 | 4/2014 | Jeong et al. |
| 2014/0184567 A1 | 7/2014 | Zachut |
| 2014/0253462 A1 | 9/2014 | Hicks |
| 2015/0002447 A1 | 1/2015 | Schediwy |
| 2015/0009187 A1 | 1/2015 | Mercea et al. |

FOREIGN PATENT DOCUMENTS

| | | |
|---|---|---|
| JP | 4-117514 A | 4/1992 |
| JP | 2010-79791 A | 4/2010 |
| JP | 2010-128648 A | 6/2010 |
| JP | 2010-217967 A | 9/2010 |
| JP | 2011-18153 A | 1/2011 |
| JP | 2011-100215 A | 5/2011 |
| JP | 2012-529126 A | 11/2012 |
| JP | 2013-8231 A | 1/2013 |
| JP | 2013-12159 A | 1/2013 |
| JP | 2013-20370 A | 1/2013 |

OTHER PUBLICATIONS

European Patent Office, Extended European Search Report, dated Aug. 16, 2016, for European Application No. 14836914.3, 10 pages.

International Search Report (English Translation), dated Oct. 21, 2014, for International Application No. PCT/JP2014/071202, 2 pages.

International Search Report and Written Opinion of the International Searching Authority, mailed Aug. 25, 2016, for International Application No. PCT/US2016/27316, 14 pages.

* cited by examiner

FIG.1
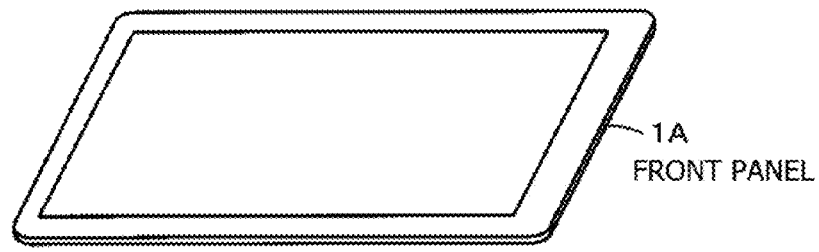
1 POINTER DETECTION APPARATUS
1A FRONT PANEL
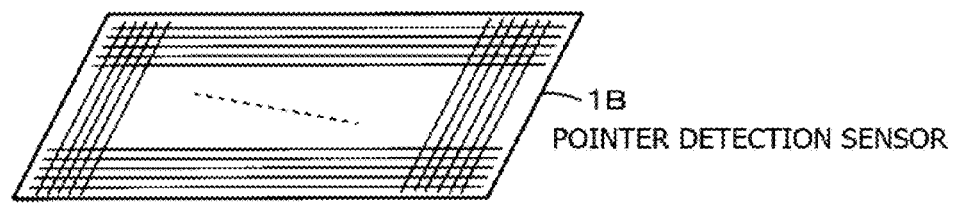
1B POINTER DETECTION SENSOR
1C LCD
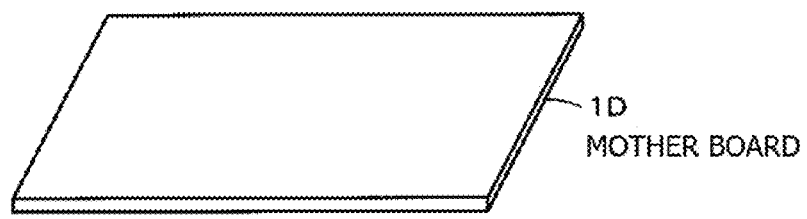
1D MOTHER BOARD
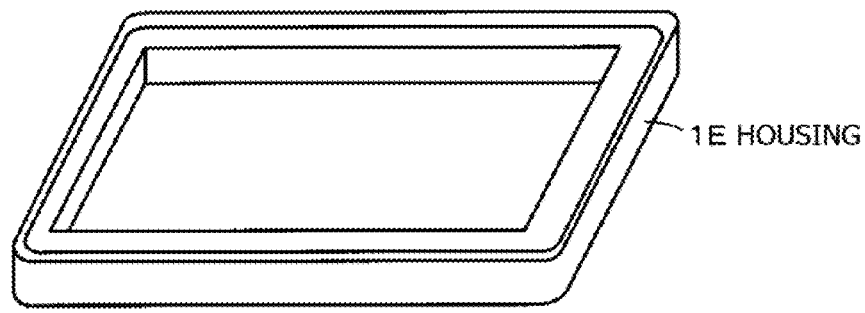
1E HOUSING

A-A CROSS SECTIONAL VIEW

FIG. 12
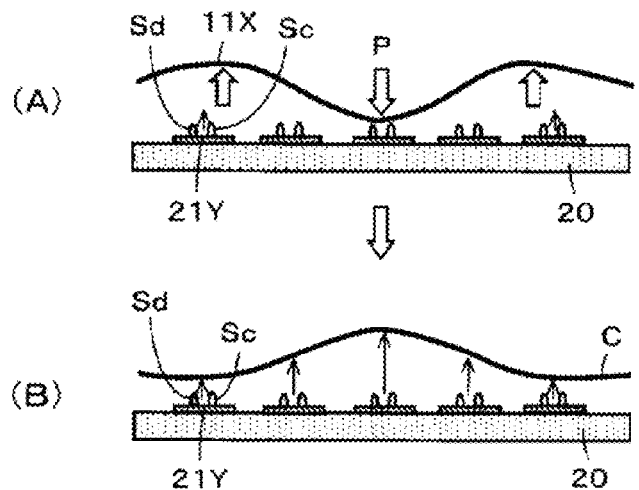
FIG. 13
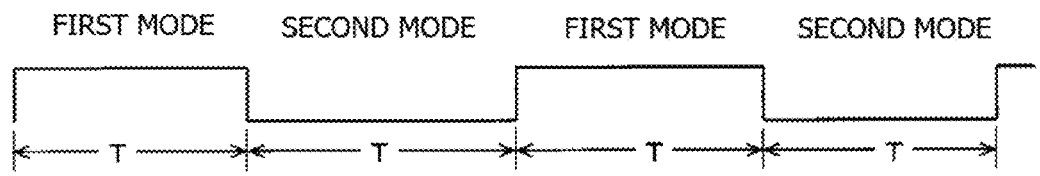
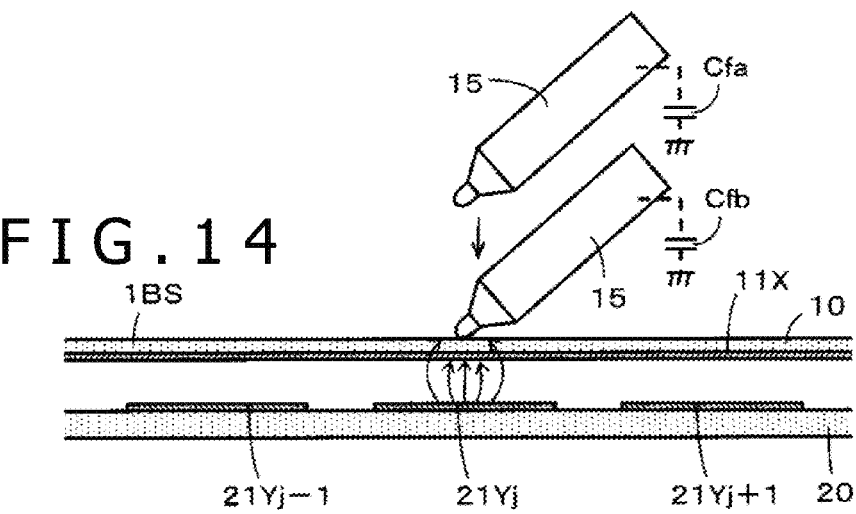
FIG. 14

FIG. 18
(A)
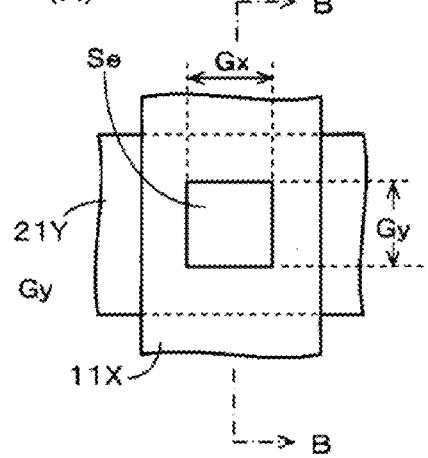
(B) B-B CROSS SECTIONAL VIEW
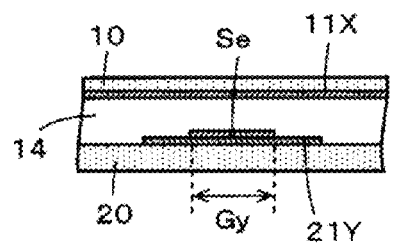
(C)
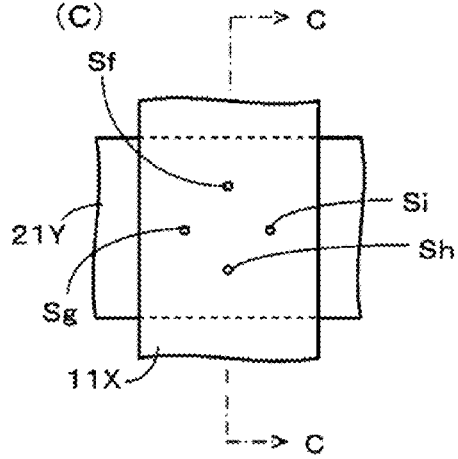
(D) C-C CROSS SECTIONAL VIEW
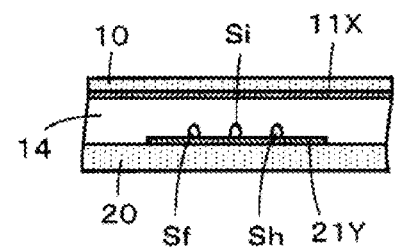
(E)
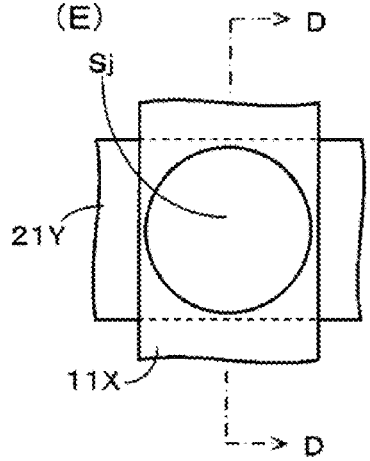
(F) D-D CROSS SECTIONAL VIEW
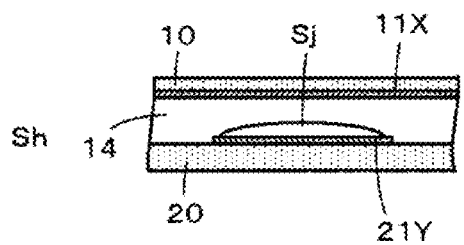

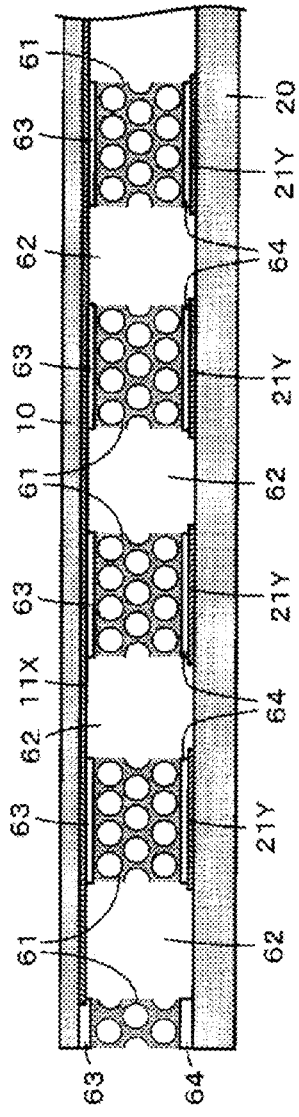
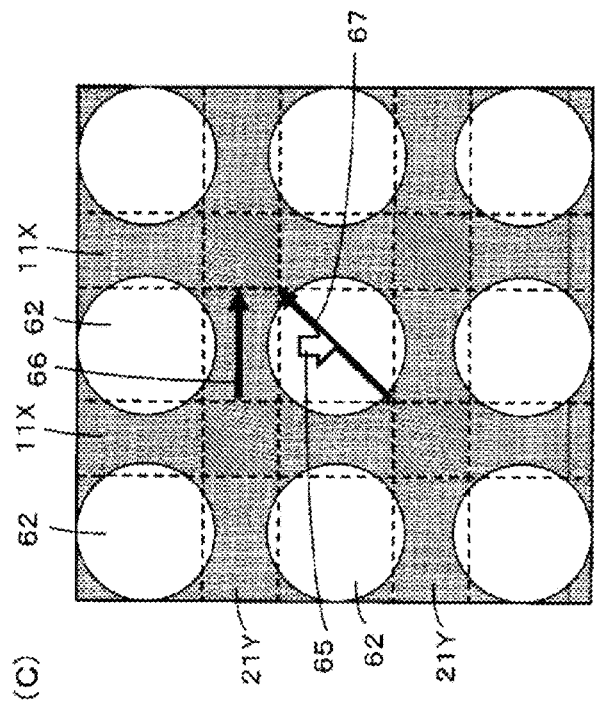
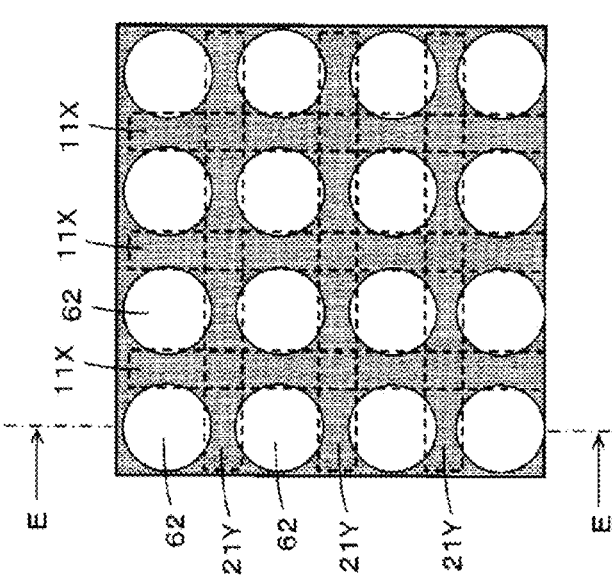
FIG. 23

FIG.24
(A)
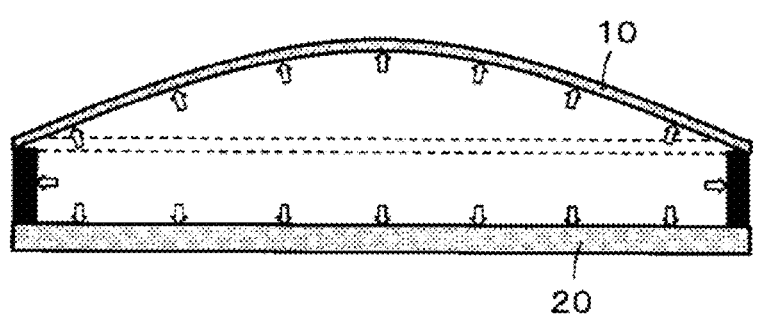
(B)
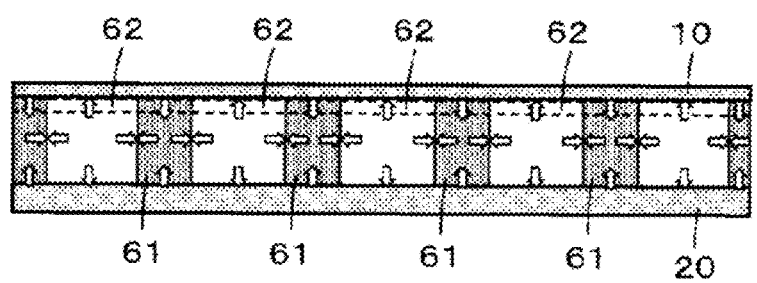

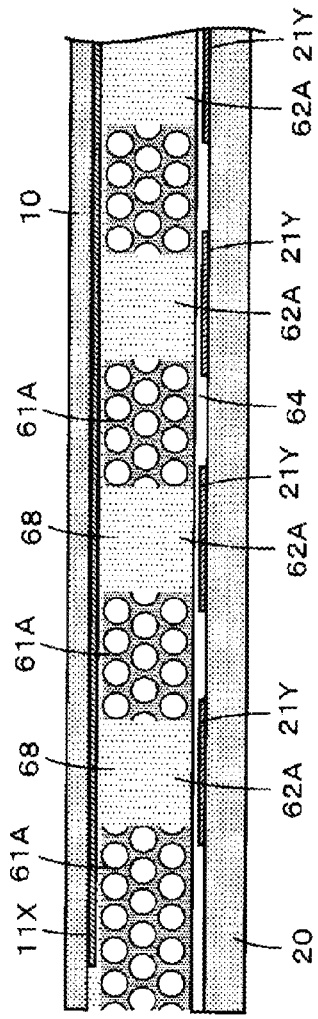
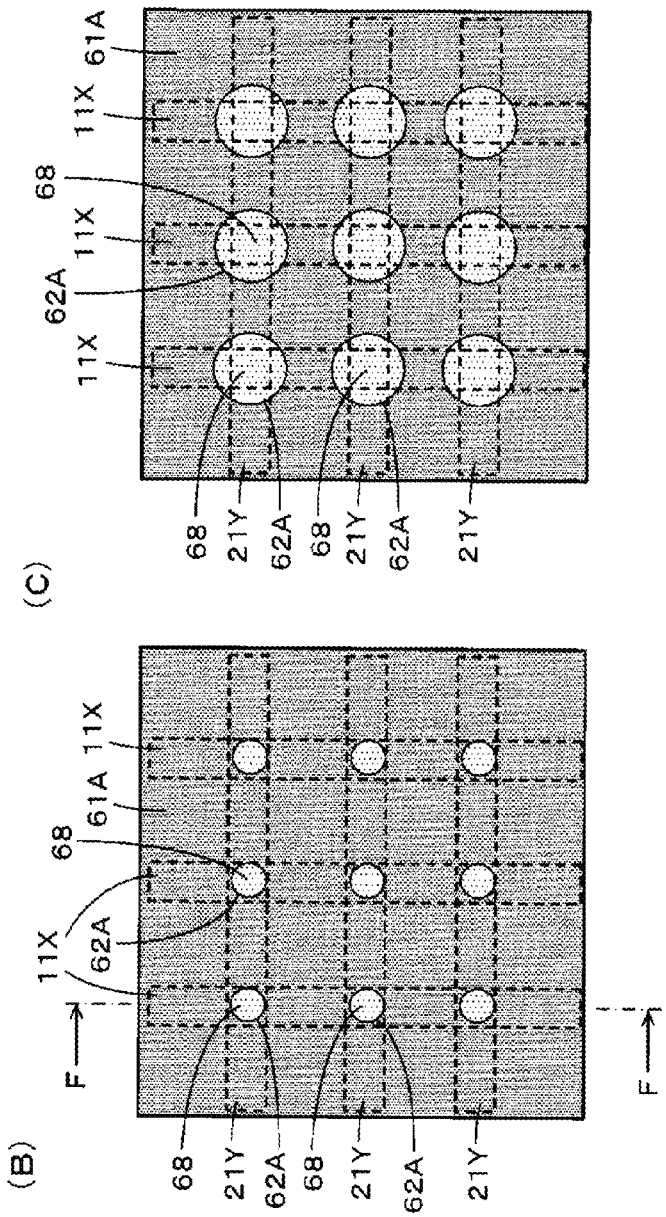
FIG. 25

FIG.28 --Prior Art--
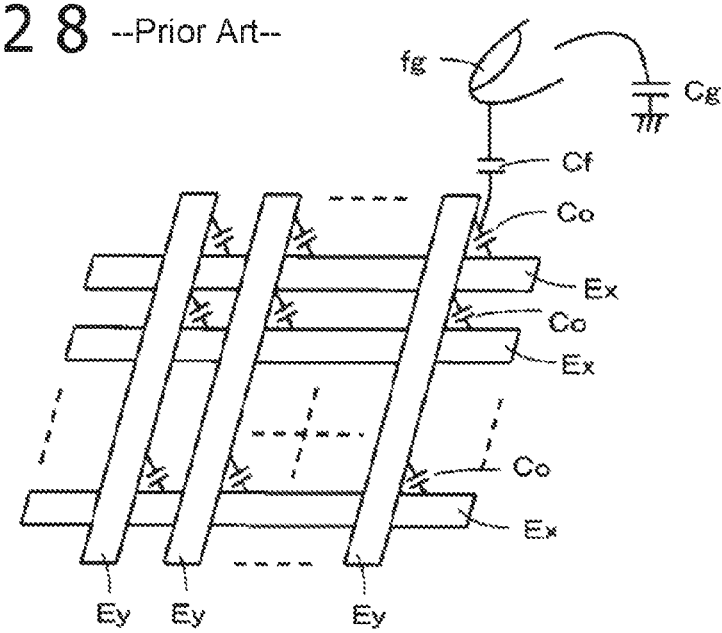
FIG.29 --Prior Art--
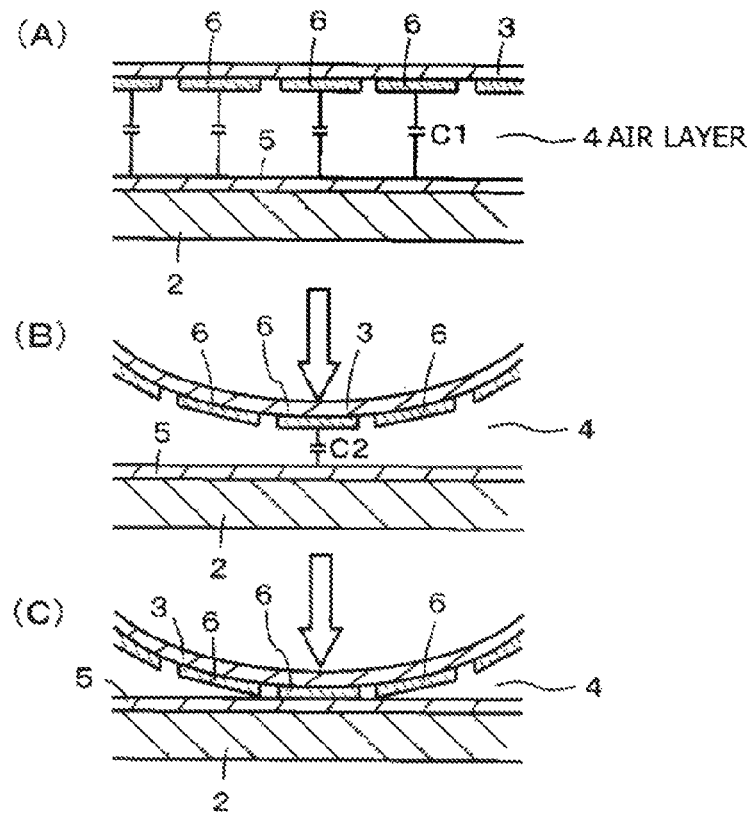

FIG.30 --Prior Art--
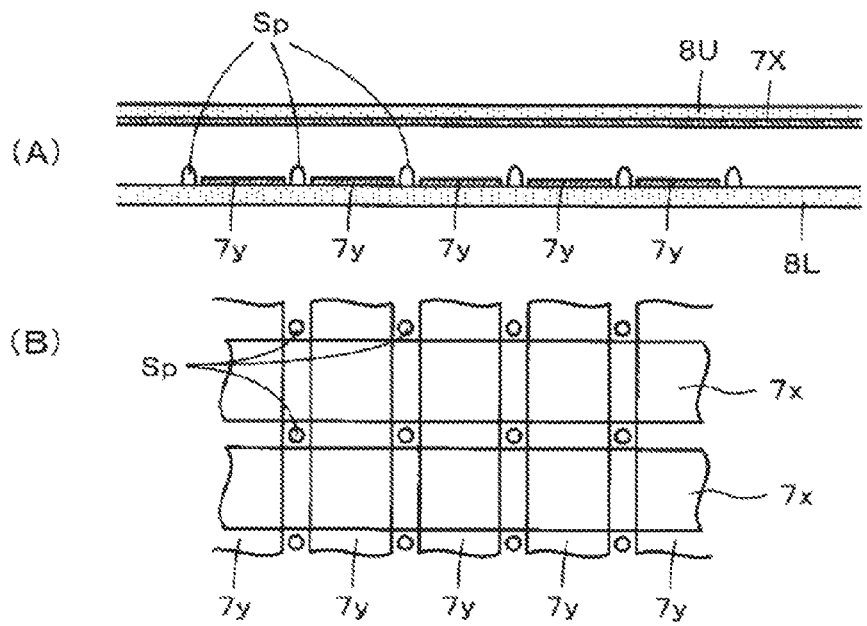
FIG.31 --Prior Art--
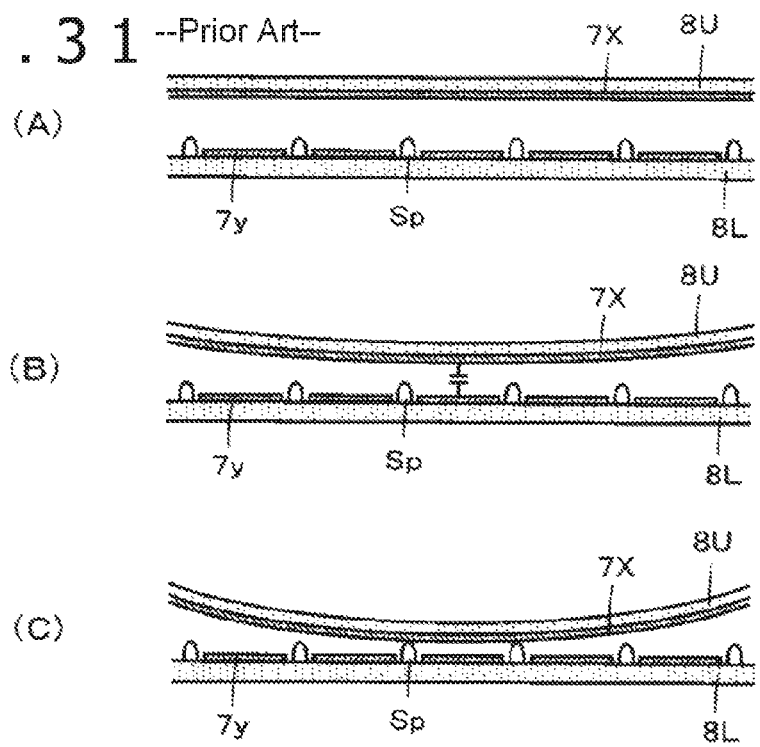

POINTER DETECTION SENSOR AND POINTER DETECTION APPARATUS

BACKGROUND

Technical Field

This disclosure relates to a pointer detection sensor and a pointer detection apparatus of a capacitance type.

Description of the Related Art

In recent years, a pointer detection apparatus of the capacitance type as a system for position detection of a pointer for use with a touch panel or the like has been and is being developed actively. Among such systems, a cross point capacitance type is available which is ready for multi-touch detection capable of detecting a plurality of pointers such as a plurality of fingers at the same time.

In a pointer detection sensor of a pointer detection apparatus of the cross point capacitance type, a determined capacitance Co (fixed capacitance) is formed in regions where portions of a plurality of upper conductors Ey and a plurality of lower conductors Ex overlap, the plurality of upper conductors Ey and the plurality of lower conductors Ex being disposed in orthogonal directions to each other as viewed in a direction orthogonal to a pointing inputting face by a pointer (the region is hereinafter referred to as region of a cross point), as depicted in FIG. 28. At a position at which a pointer fg such as a finger of a user contacts with the pointing inputting face, the pointer fg is connected to the ground through the human body, and through a capacitance Cg between the human body and the ground, a capacitance Cf is formed between an upper conductor Ey and a lower conductor Ex at the position and the pointer fg. In this manner, since capacitance Cf and capacitance Cg are formed at a position at which the pointer fg contacts with the pointing inputting face, charge between the upper conductor Ey and the lower conductor Ex varies. By detecting the variation in charge, the position pointed to by the pointer on the pointing inputting face can be specified.

However, the variation in capacitance in a region of a cross point when a finger is positioned nearby is very small, and while the value of the capacitance Co between the upper conductor Ey and the lower conductor Ex is, for example, 0.5 pF, the variation in capacitance in the region of a cross point is only approximately 0.05 pF. Therefore, the margin for the detection output of the pointer with respect to noise is severe, and it is difficult to detect a pointer such as a finger with a high sensitivity. Further, there is a problem that a pointer can be detected only where the pointer is a conductor including the human body and, in such a state that a person wears a rubber glove, a finger of the person cannot be detected as a pointer.

In Patent Document 1 (Japanese Patent Laid-Open No. 2010-79791), a capacitance type inputting apparatus is disclosed which is improved in regard to the problem and can detect a pointer different from a finger or a capacitive pen.

A pointer detection sensor for the inputting apparatus of Patent Document 1 includes, as depicted in FIG. 29(A), a first substrate 2, a flexible second substrate 3 opposing to the first substrate 2 with an air layer 4 interposed there between, a first conductor 5 formed over a substantially overall area of a face of the first substrate 2 on the second substrate 3 side, and a plurality of second conductors 6 formed on a face of the second substrate 3 on the first substrate 2 side. When the second substrate 3 is not pressed by a pointer, a capacitance C1 is formed between each of the plurality of second conductors 6 and the first conductor 5 as depicted in FIG. 29(A). However, if the second substrate 3 is pressed, then since the second substrate 3 has flexibility, the second substrate 3 is deflected at the pressed position thereof to the first substrate 2 side as indicated by an arrow mark in FIG. 29(B). Consequently, the distance between the first substrate 2 and the second substrate 3 decreases, and the capacitance configured from the first conductor 5 and a second conductor 6 at the portion changes to C2 higher than C1 mentioned above. If the second substrate 3 is pressed further as depicted in FIG. 29(C), then the second conductor 6 is brought into contact with the first conductor 5 to establish a conducting state, and the pressing input at the pressed position can be settled.

In the case of Patent Document 1, there is no restriction to the pointer, and even if a person wears a rubber glove or the like, the pressed pointed position can be detected. However, according to the detection method of Patent Document 1, although the capacitance type is adopted, a pressing input is settled by detecting a state in which the second conductor 6 is brought into contact with the first conductor 5 to establish a conducting state there between. Accordingly, even if it is possible to detect the position pressed by the pointer, it is difficult to detect the pressing force of the pointer to the second substrate 3 with a high degree of accuracy.

In Patent Document 2 (Japanese Patent Laid-Open No. 2013-20370), a pointer detection sensor and a pointer detection apparatus which solve the problem just described are provided. In the pointer detection sensor disclosed in Patent Document 2, a spacer Sp is disposed in each of regions different from overlapping regions between a plurality of upper conductors 7x and a plurality of lower conductors 7y disposed in orthogonal directions to each other as depicted in FIGS. 30(A) and 30(B). Consequently, the regions of the cross points are delimited by the spacers Sp, and therefore, pressing by a pointer in the region of each cross point can be detected accurately.

As depicted in FIG. 30(A), the conductors 7x and the conductors 7y are formed on mutually opposing faces of an upper side transparent glass substrate 8U and a lower side transparent glass substrate 8L. The upper side transparent glass substrate 8U has a small thickness sufficient to allow the upper side transparent glass substrate 8U to be deflected to the lower side. Further, the spacers Sp are disposed on, for example, the lower side transparent glass substrate 8L at positions opposing to regions in which no lower conductor 7x is formed and no upper conductor 7y is formed. In other words, the spacers Sp are formed in regions in which none of the lower conductors 7x and the upper conductors 7y are formed as viewed from the upper side transparent glass substrate 8U side.

The pressing detection principle of the pointer detection sensor of Patent Document 2 depicted in FIG. 30 is such as described below with reference to FIG. 31. Here, a case in which pressing by a pointer is carried out from the upper side transparent glass substrate 8U side in FIG. 31 is described.

In particular, if the upper side transparent glass substrate 8U is not contacted by the pointer as depicted in FIG. 31(A), then the capacitance (initial capacitance) generated between an upper conductor 7x and a lower conductor 7y is as low as, for example, approximately 1 to 2 pF. Then, if the pointer is pressed against the upper side transparent glass substrate 8U as depicted in FIG. 31(B) to apply pressing of a middle level to the upper side transparent glass substrate 8U, then the distance between the upper conductor 7x and the lower conductor 7y decreases. Thus, the capacitance between the upper conductor 7x and the lower conductor 7y between which the distance decreases in this manner varies and becomes, for example, approximately 5 to 6 pF. Then, if pressing is applied further to the upper side transparent glass substrate 8U as depicted in FIG. 31(C), then the distance between the upper conductor 7x and the lower conductor 7y at the portion at which the pressing is applied further decreases. Consequently, the capacitance between the upper conductor 7x and the lower conductor 7y varies by a great amount and becomes, for example, approximately 10 pF.

By detecting a variation in capacitance between the upper conductor 7x and the lower conductor 7y in the region of each cross point in such a manner as described above, the pressing in the region of each cross point can be detected.

PATENT DOCUMENTS

Patent Document 1: Japanese Patent Laid-Open No. 2010-79791
Patent Document 2: Japanese Patent Laid-Open No. 2013-20370

BRIEF SUMMARY

The structure of the pointer detection sensor of Patent Document 2 has the following problems because the spacers Sp are formed in regions, which are not the regions of the cross points and at which none of the upper conductors 7x and the lower conductors 7y are formed, in the four corners surrounding the regions of the cross points.

For example, it is assumed that, if the upper side transparent glass substrate 8U is pressed by the pointer in pressing force Pa, then the upper conductor 7x is deflected so as to further approach the lower conductor 7y side below the height of the spacers Sp in the regions of the cross points, as indicated by a thick broken line in FIG. 32. However, even if the upper side transparent glass substrate 8U is pressed at a position above a spacer Sp in the same pressing force Pa, the upper conductor 7x is deflected only to the height of the spacer Sp, as indicated by a thick alternate long and short dash line in FIG. 32, due to the presence of the spacer Sp.

In particular, in the regions which are other than the regions of the cross points and in which the spacers Sp exist but none of the conductors 7x and 7y exist, the height of the spacers Sp is a distance over which the upper conductors 7x come closest to the lower conductors 7y. Thus, between a region in which a spacer Sp exists and a region of a cross point in which no spacer Sp exists, a difference in distance between the upper electrode 7x and the lower conductor 7y appears even if both regions are pressed in an equal pressing force. Consequently, a difference appears also in the capacitance between the conductors which is varied with a parameter provided by the distance between the conductors.

In particular, even if, in a region in which a spacer Sp exists, the upper conductor 7x is pressed by a pointer in pressing force higher than such pressing force that the upper conductor 7x is brought into contact with a tip of the spacer Sp, such pressing force as just described cannot be detected because the upper side transparent glass substrate 8U is not deflected farther than the height of the spacer Sp. Therefore, a characteristic is quite different between the pressing force versus capacitance in the region of a cross point and the pressing force versus capacitance in a region in which a spacer Sp exists.

Besides, since none of the conductors 7x and 7y exist in regions in which a spacer Sp exists, the difference in capacitance between the conductor 7x and the conductor 7y is great between the regions of the cross points and the other regions in which a spacer Sp exists.

Generally, in a pointer detection sensor and a pointer detection apparatus of the type described, an X direction coordinate and a Y direction coordinate of a pointed position by a pointer are each detected from a signal level corresponding to a capacitance obtained from three conductors positioned adjacent each other. However, as described above, between a region of a cross point and a different region in which a spacer exists, such a difference in capacitance as described above exists, and therefore, the coordinates of the pointed position by the pointer cannot be detected with a high degree of accuracy. In the case of Patent Document 2, there is a problem that, if a tracing operation is carried out, for example, spirally by a pointer, then a display locus displayed in response to the tracing operation on the display screen does not make a smooth curve but makes a ragged line as depicted in FIG. 33 because of the deterioration in position accuracy described above.

Further, in the case of Patent Document 2, since it is necessary to dispose the spacers Sp in the regions which are other than the regions of cross points and in which none of the conductors 7x and 7y exist, the disposition distance between the spacers Sp becomes greater than at least the width of each of the conductors 7x and 7y. Further, in order to obtain a determined deflection amount of the conductors 7x so that a determined pressing force by a pointer can be detected from a capacitance between the conductors 7x and 7y at a region of a cross point, it is necessary to form the spacers Sp so as to have a sufficient height.

Therefore, when a tracing operation is carried out while the upper side transparent glass substrate 8U is pressed, there is the possibility that the operator may touch with a tip of the spacers Sp outside the regions of cross points and have a rugged operation feeling.

In an embodiment, a pointer detection sensor of a capacitance type comprises: a plurality of first conductors disposed in a first direction and a plurality of second conductors disposed in a second direction crossing with the first direction disposed in an opposing relationship to each other and in a spaced relationship by a determined distance from each other, wherein a variation of a capacitance formed between any of the first conductors and any of the second conductors based on a variation of a distance between the first conductor and the second conductor when one of the first conductor and the second conductor is deflected by pressing by a pointer is detected to detect a position pointed to by the pointer; and a spacer disposed between the first conductor and the second conductor only in a region of a cross point at which the first conductor and the second conductor cross and overlap with each other.

In an embodiment of the pointer detection sensor having the configuration described above, the spacer is provided only in the region of the cross point.

In an embodiment, the capacitance between the first conductor and the second conductor pressed by the pointer can be prevented from being made different between the region of the cross point and other regions. Consequently, an embodiment facilitates detection of coordinates of the pointed position by the pointer with high accuracy.

In an embodiment, the height of the spacer can be made low, to facilitate reducing a rugged operation feeling upon touching with a tip of the spacer when tracing operation inputting is carried out using the pointer.

In an embodiment, the capacitance between the first conductor and the second conductor when pressed by the pointer can be prevented from being made different between the region of the cross point and any other region. Consequently, an embodiment facilitates detection of coordinates of the pointed position by the pointer with high accuracy. Further, an embodiment facilitates improving the operation feeling upon a tracing operation while pressing by the pointer is being carried out.

BRIEF DESCRIPTION OF THE SEVERAL VIEWS OF THE DRAWINGS

FIG. 1 is a view illustrating an example of a mechanical configuration of an embodiment of a pointer detection apparatus.

FIG. 12 is a view illustrating a variation in the capacitance between the first conductor and the second conductor when pressing force is applied from the pointer in an embodiment of the pointer detection sensor.

FIG. 13 is a view illustrating detection by pointers of different types in an embodiment of the pointer detection apparatus.

FIG. 14 is a view illustrating detection by one of the pointers of different types in an embodiment of the pointer detection apparatus.

FIG. 18 is a view illustrating modifications to an embodiment of the pointer detection sensor.

FIG. 23 is a view illustrating an embodiment of a pointer detection sensor.

FIG. 24 is a view illustrating an effect of an embodiment of the pointer detection sensor.

FIG. 25 is a view illustrating an embodiment of a pointer detection sensor.

FIG. 28 is a view illustrating a configuration of a pointer detection sensor of the capacitance type.

FIG. 29 is a view illustrating an example of a conventional pointer detection sensor.

FIG. 30 is a view illustrating an example of the pointer detection sensor proposed previously.

FIG. 31 is a view illustrating an example of the pointer detection sensor proposed previously.

DETAILED DESCRIPTION

Figure 2:
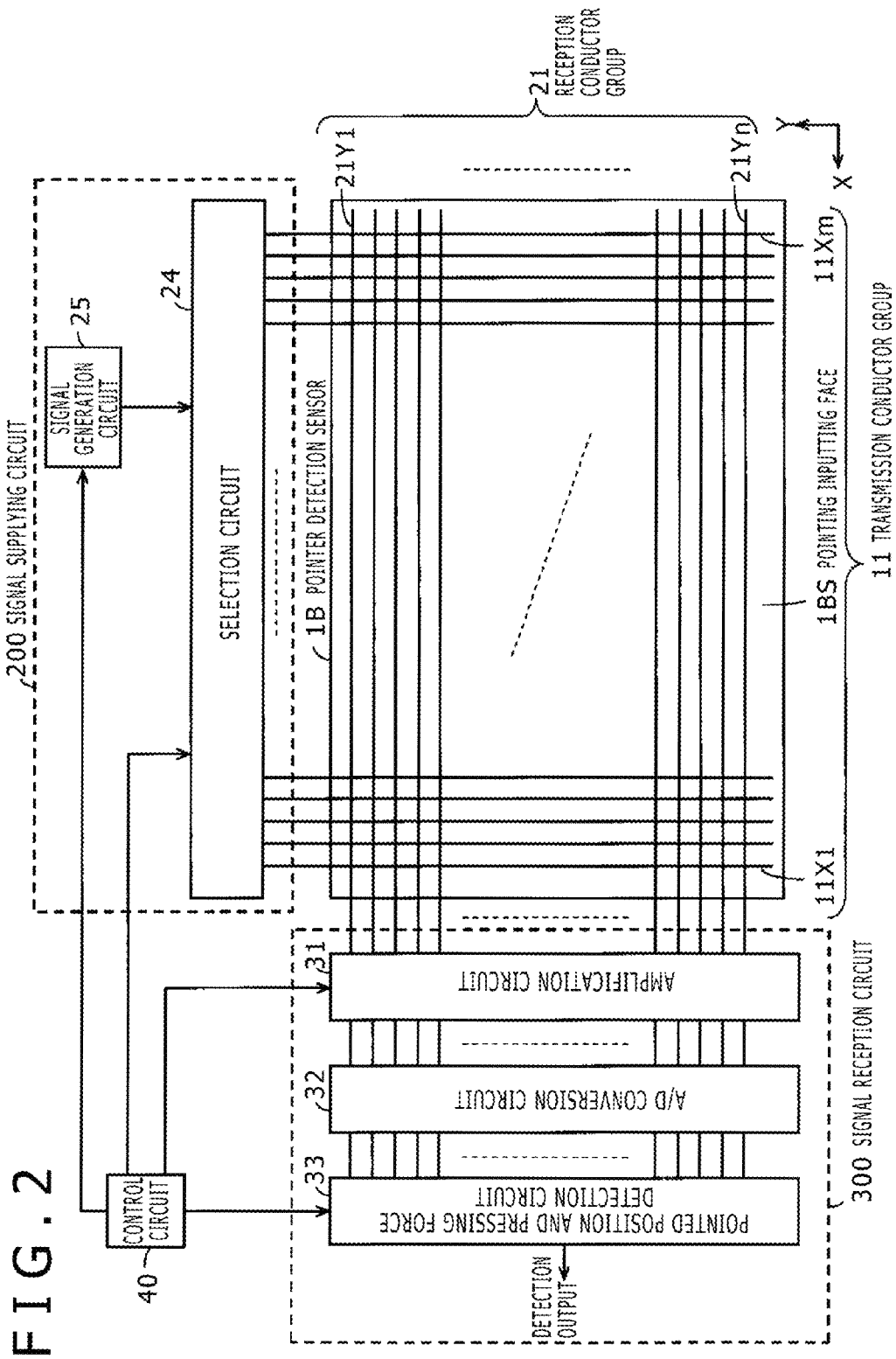
FIG. 2 is a view illustrating an example of a circuit configuration of an embodiment of the pointer detection apparatus.

In the following, embodiments of a pointer detection apparatus and a pointer detection sensor are described with reference to the drawings. In the embodiments described below, an example is described in which a pointer detection apparatus is applied to an apparatus with a displaying function, e.g., a tablet apparatus with a displaying function, a tablet type information terminal or a pad type information terminal, etc.

First Embodiment

General Configuration of Pointer Detection Apparatus 1

FIG. 1 is an exploded perspective view depicting an outline of a configuration of a pointer detection apparatus 1 of the present embodiment. The pointer detection apparatus 1 of the present embodiment is configured as an apparatus with a displaying function. As depicted in FIG. 1, the pointer detection apparatus 1 of the present embodiment includes a mother board 1D accommodated in the lowermost layer in a housing 1E, and an LCD (Liquid Crystal Display) 1C provided on the mother board 1D such that a display screen thereof is disposed on the upper side (front panel 1A side). A pointer detection sensor 1B of the embodiment is provided on the display screen side of the LCD 1C. The front panel 1A is provided on the upper side of the pointer detection sensor 1B, and the accommodation articles 1D, 1C and 1B described above are held in the housing 1E.

Here, various circuits such as communication circuits, controlling circuits for the LCD 1C, a signal supplying circuit for supplying a signal to the pointer detection sensor 1B, a signal reception circuit for receiving a signal from the pointer detection sensor 1B to detect a pointed position and so forth are formed on the mother board 1D. The LCD 1C is a display configured to implement the displaying function of the pointer detection apparatus 1 of the present embodiment. The pointer detection sensor 1B is configured, for example as described in more detail elsewhere herein, and implements functions by accepting various instruction inputs (operation inputs) from a user.

As described hereinabove, the display screen of the LCD 1C is observed through the pointer detection sensor 1B. To this end, the pointer detection sensor 1B is configured so as to have a light permeability (transparency). Consequently, while the user observes information display on the LCD 1C from the front panel 1A side of the pointer detection apparatus 1, the user can carry out various instruction inputs through the pointer detection sensor 1B.

It is to be noted that, though not depicted in FIG. 1, the LCD 1C and the pointer detection sensor 1B are connected to corresponding circuit units of the mother board. Although detailed description is given herein below, the pointer detection apparatus is configured from the pointer detection sensor 1B and the signal supplying circuit and the signal reception circuit provided on the mother board 1D. Further, the pointer detection apparatus 1 may be implemented in various sizes in appearance such as, for example, represented as paper sizes, the A5 size, B5 size and A4 size in Japan.

Example of Configuration of Pointer Detection Apparatus

Now, an example of a configuration of the pointer detection apparatus including the pointer detection sensor 1B is described. FIG. 2 is a block diagram depicting an example of a configuration of the pointer detection apparatus of the present embodiment. As depicted in FIG. 2, the pointer detection apparatus of the present embodiment includes the pointer detection sensor 1B depicted in FIG. 1, a signal supplying circuit 200, a signal reception circuit 300 and a control circuit 40. The control circuit 40 is a circuit which in operation controls the components of the pointer detection apparatus of the present embodiment and may include, for example, a microcomputer.

The pointer detection sensor 1B includes a plurality of first conductors 11X1 to 11Xm connected to the signal supplying circuit 200, and a plurality of second conductors 21Y1 to 21Yn connected to the signal reception circuit 300. The first conductors 11X1 to 11Xm form a transmission conductor group 11. Meanwhile, the second conductors 21Y1 to 21Yn form a reception conductor group 21.

It is to be noted that, in the description of the first conductors 11X1 to 11Xm and the second conductors 21Y1 to 21Yn given below, one of the first conductors 11X1 to 11Xm is referred to as first conductor 11X and one of the second conductors 21Y1 to 21Yn is referred to as second conductor 21Y except where they are described distinctly for each one conductor. Further, the number of the first conductors 11X forming the transmission conductor group 11 and the number of the second conductors 21Y forming the reception conductor group 21 are set suitably in accordance with the size of a pointing inputting face 1BS of the pointer detection sensor 1B to be operated by the user or the like. Further, in the present embodiment, the transmission conductor group 11 side is used as the pointing inputting face 1BS for which pointing inputting is carried out with a pointer such as a finger of the user or the like.

In FIG. 2, an X axis arrow mark depicted at a right lower corner portion indicates an X axis direction, and a Y axis arrow mark indicates a Y axis direction similarly. Further, although detailed description is hereinafter given, the transmission conductor group 11 is formed from m first conductors 11X elongated (in the form of a flat plate) extending in the Y axis direction (example of the first direction) of the pointer detection sensor 1B and arrayed with a determined distance left there between in the X axis direction. Meanwhile, the reception conductor group 21 is formed from n second conductors 21Y elongated (in the form of a flat plate) extending in the X axis direction (example of the second direction) of the pointer detection sensor 1B and arrayed with a determined distance left there between in the Y axis direction.

Further, although detailed description is hereinafter given, the transmission conductor group 11 and the reception conductor group 21 are disposed in an opposing relationship to each other with a determined distance left there between. Consequently, a capacitor is positioned at locations at which the first conductors 11X and the second conductors 21Y oppose to each other. Further, in the present embodiment, a spacer is disposed as hereinafter described in a region at each of cross points at which the first conductors 11X and the second conductors 21Y oppose to each other such that they overlap with each other as viewed in a direction orthogonal to the pointing inputting face 1BS. It is to be noted that, in the present embodiment, the first conductors 11X and the second conductors 21Y may be formed of a transparent electrode film such as a silver pattern or an ITO (Indium Tin Oxide) film or from copper foil or the like.

The signal supplying circuit 200 supplies a signal for enabling detection of a pointed position by a pointer on the pointing inputting face 1BS of the pointer detection sensor 1B or pressing force applied to the pointed position, in the present example, to each of the first conductors 11X which configure the transmission conductor group 11. The signal supplying circuit 200 includes a selection circuit 24 and a signal generation circuit 25 as depicted in FIG. 2. The selection circuit 24 supplies a signal from the signal generation circuit 25 selectively to the first conductors 11X under the control of the control circuit 40. The signal generation circuit 25 generates an alternating current signal of a sine wave, a rectangular wave or the like having a determined frequency and supplies the generated alternating current signal to the selection circuit 24 under the control of the control circuit 40.

The selection circuit 24 in the present embodiment is switching-controlled by the control circuit 40 so as to supply a signal from the signal generation circuit 25 to all of the first conductors 11X1 to 11Xm within a determined time period. The reason why an alternating current signal from the signal generation circuit 25 is selectively supplied to the first conductors 11X by the selection circuit 24 in this manner is that it facilitates detecting a plurality of pointed positions on the pointing inputting face 1BS and pressing force applied to the pointed positions.

The signal reception circuit 300 carries out signal processing for reception signals obtained from the plurality of second conductors 21Y which form the reception conductor group 21 in the present example to carry out detection of pointed positions on the pointing inputting face 1BS by a pointer or pointers and detection of pressing force applied to the pointed positions. As depicted in FIG. 2, the signal reception circuit 300 includes an amplification circuit 31, an A/D (Analog/Digital) conversion circuit 32, and a pointed position and pressing force detection circuit 33.

The amplification circuit 31 amplifies reception signals obtained from the second conductors 21Y forming the reception conductor group 21 and supplies the reception signals to the A/D conversion circuit 32. The A/D conversion circuit 32 converts the reception signals from the second conductors 21Y amplified by the amplification circuit 31 into digital signals and supplies the digital signal to the pointed position and pressing force detection circuit 33.

The pointed position and pressing force detection circuit 33 carries out, when pointing inputting by a pointer is performed for the pointer detection sensor 1B, detection (identification) of the pointed position on the pointing inputting face 1BS pointed to and detection of applied force (pressing force) on the basis of signals from the A/D conversion circuit 32. As described hereinabove, at a location at which a first conductor 11X and a second conductor 21Y oppose to each other, a capacitor is positioned.

Although details are hereinafter described, if pressing force is applied by a pointer to the pointer detection sensor 1B, then the pointing inputting face 1BS is deflected in response to the pressing force, and the distance between one or a plurality of first conductors 11X and one or a plurality of second conductors 21Y at a location at which the pressing force is applied varies. Therefore, the capacitance of the capacitors formed from the first conductors 11X and one or a plurality of second conductors 21Y varies in response to the pressing force. Consequently, at the location at which the capacitance varies, a signal or signals (current) transmitted from the first conductors 11X to the second conductors 21Y increases.

Therefore, by monitoring the signal mount (current amount) flowing to the individual conductors of the plurality of second conductors 21Y, it can be detected which position on the pointer detection sensor 1B is operated for pointing by a pointer. It is to be noted that to which first conductor 11X an alternating current signal is being supplied can be recognized from information from the control circuit 40. From the information mentioned, it can be detected that a location at which the first conductor 11X to which an alternating current signal from the signal generation circuit 25 is being supplied and a second conductor 21Y whose signal amount varies in response to a pointed position by a pointer is a position region pointed to by the pointer. Besides, since the capacitance of the capacitor varies in response to pressing by the pointer, also it can be detected with which strength pressing force is applied to the pointer detection sensor 1B from the pointer by detecting the signal mount flowing through the second conductor 21Y.

In this manner, the pointed position and pressing force detection circuit 33 can detect a signal corresponding to pressing force by the pointer in addition to the position pointed to by the pointer. The pointed position and the pressing force detected by the pointed position and pressing force detection circuit 33 may be supplied to a control circuit (not shown) in the mother board 1D and used as input information from the user.

The pointer detection apparatus 1 which includes the pointer detection sensor 1B according to the present embodiment has a hybrid type configuration having a first mode and a second mode. In the first mode, a pointed position and pressing force by a pointer are detected by detecting that the capacitance between a first conductor 11X and a second conductor 21Y is varied by charge which leaks to a ground through a pointer having conductivity such as a finger of a person or a pointer (electrostatic pen) of the pen type with conductive core body or housing. In the second mode, a pointed position and pressing force by a pointer are detected by detecting a variation of the capacitance between a first conductor 11X and a second conductor 21Y in response to pressing force by a finger of a user who wears a rubber glove or a pointer of the pen type which does not have conductivity.

Although the configuration of the hybrid type is hereinafter described in detail, in the present embodiment, the control circuit 40 controls the pointed position and pressing force detection circuit 33 to repeat a detection processing operation of a pointer in the first mode and a detection processing operation of a pointer in the second mode alternately through time division switching to achieve a configuration which can carry out, even if pointing inputting operations are performed simultaneously for the pointer detection sensor 1B using pointers of different types, simultaneous detection of the plurality of pointers irrespective of the different in type. It is to be noted that the control circuit 40 carries out also control for supplying a gain controlling signal to the amplification circuit 31 to switch the gain of the amplification circuit 31 between the first mode and the second mode.

Example of Configuration of Pointer Detection Sensor 1B

Figure 3:
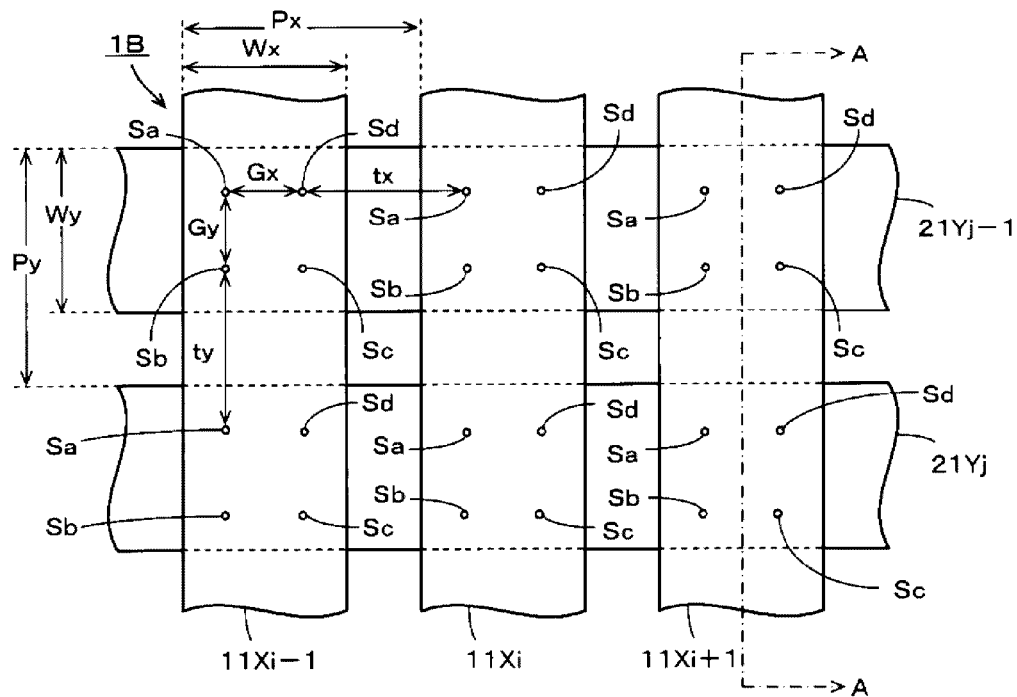
FIG. 3 is a view illustrating a part of an embodiment of a pointer detection sensor.
Figure 4:
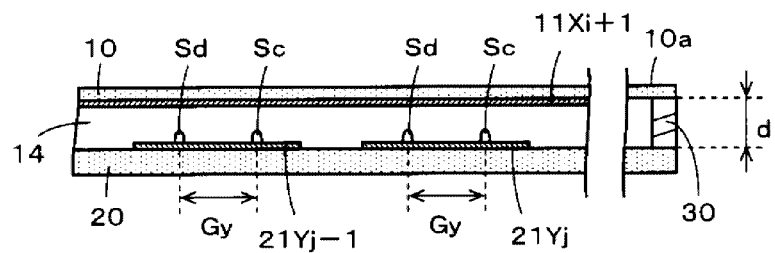
FIG. 4 is a view illustrating a part of an embodiment of the pointer detection sensor.

Now, an example of a configuration of the pointer detection sensor 1B is described particularly with reference to FIGS. 3 and 4. FIG. 3 is a view illustrating an example of a configuration when the pointer detection sensor 1B of the embodiment is viewed in a direction perpendicular to the pointing inputting face 1BS from the pointing inputting face 1BS side and is a view depicting part of the pointer detection sensor 1B. FIG. 4 is a cross sectional view of the pointer detection sensor 1B of the embodiment and here is a sectional view taken along line A-A in FIG. 3. It is to be noted that, in the pointer detection sensor 1B depicted in FIG. 3, the direction in which the first conductors 11X are arrayed is an X-axis direction, and the direction in which the second conductors 21Y are arrayed is a Y-axis direction. It is to be noted that, in the following description, the pointing inputting face 1BS side is referred to as upper side.

As depicted in FIG. 4, the pointer detection sensor 1B is configured from an upper side substrate (first substrate) 10 and a lower side substrate (second substrate) 20 disposed on the upper side and the lower side, respectively. An upper face 10a of the upper side substrate 10 on the opposite side to the opposing face thereof to the lower side substrate 20 serves as the pointing inputting face 1BS.

The upper side substrate 10 is formed from a flexible material which can be deflected to the lower side substrate 20 side when the pointing inputting face 1BS (upper face 10a of the upper side substrate 10) is pressed by a pointer, and is formed, in the present example, from a comparatively thin glass plate or a film substrate made of transparent synthetic resin such as PET (polyethylene terephthalate), PP (polypropylene), LCP (liquid crystal polymer) or the like. The lower side substrate 20 need not be deflected because it is not pressed by a pointer and is, in the present example, formed from a glass substrate or a transparent synthetic resin of a rigid body thicker than the upper side substrate 10.

Further, on the opposing face side of the upper side substrate 10 to the lower side substrate 20, m (m is an integer equal to or greater than 2) elongated (plate-shaped) first conductors 11X1, 11X2, 11Xi−1, 11Xi, 11Xi+1, . . . , and 11Xm which have a determined width Wx and extend in the Y-axis direction are arrayed at a determined array pitch Px (>Wx) in the X-axis direction. Each of the m first conductors 11X is, in the present example, formed from a transparent electrode made of ITO (Indium Tin Oxide). The m first conductors 11X are individually connected to the selection circuit 24, which configures the signal supplying circuit 200 depicted in FIG. 2, provided on the mother board 1D individually through first connecting conductors (not depicted).

Further, on the opposing face side of the lower side substrate 20 to the upper side substrate 10, n (n is an integer equal to or greater than 2) elongated (plate-shaped) second conductors 21Y1, 21Y2, 21Yj−1, 21Yj, . . . , and 21Yn having a determined width Wy and extending in the X-axis direction are arrayed at a determined array pitch Py (>Wy) in the Y-axis direction. Each of the n second conductors 21Y is, in the present example, formed from a transparent electrode made of ITO (Indium Tin Oxide). The n second conductors 21Y are individually connected to the amplification circuit 31, which configures the signal reception circuit 300 depicted in FIG. 2, provided on the mother board 1D through second connecting conductors (not depicted).

It is to be noted that, in the present embodiment, the widths Wx and Wy are equal to each other and the magnitude thereof is selectively set, for example, to 2 to 2.5 mm and, in the present example, to Wx=Wy=2.5 mm. Further, in the present embodiment, the array pitches Px and Py are equal to each other and are selectively set, for example, to Px=Py=3.2 mm.

Further, on the upper side substrate 10 having flexibility to which a glass substrate, a film substrate made of a synthetic resin material or the like is applied, the first conductors 11X may be formed integrally with the upper side substrate 10 by a known conductor formation process such as vapor deposition or printing. Similarly, on the lower side substrate 20 to which a glass substrate, a synthetic resin substrate or the like is applied, the second conductors 21Y may be formed integrally with the lower side substrate 20 by a known conductor formation process such as vapor deposition or printing.

It is to be noted that, though not depicted, a dielectric member is provided on the upper side substrate 10 in such a manner as to cover the entire m first conductors 11X1 to 11Xm. The dielectric member is configured from a transparent dielectric film made of a dielectric having a relative dielectric constant of approximately 2 to 10 such as, for example, PET (polyethylene terephthalate), PP (polypropylene) or LCP (liquid crystal polymer). The thickness of the layer of the dielectric member is, for example, 5 to 15 μm. Also a glass material is applicable as the dielectric member. Further, the dielectric member may be configured from a dielectric file (having a relative dielectric constant of 40 or more) in which a high dielectric constant filler is filled. Further, as the dielectric member, various dielectrics having transparency such as a transparent epoxy resin, an acrylic-based resin for photoresist, a high optical transparency fluorine resin, a one-component urethane resin and so forth are applicable. It is to be noted that the dielectric member may not be provided.

The upper side substrate 10 and the lower side substrate 20 are bonded at peripheral portions thereof and sealed to each other with a bonding member 30 of a framework shape interposed there between such that the peripheral portions thereof are spaced by a determined distance d from each other. Accordingly, in the pointer detection sensor 1B of the present embodiment, in the present example, an air layer 14 is interposed in a sealed state in an air gap between the lower side substrate 20 and the upper side substrate 10. In the present embodiment, the distance d between the lower side substrate 20 and the upper side substrate 10 is 20 to 100 μm and is, in the present example, d=40 μm. It is to be noted that, in the air gap between the lower side substrate 20 and the upper side substrate 10, not the air layer but transparent liquid may be enclosed. The liquid layer may increase the transparency between the upper side substrate 10 and the lower side substrate 20.

Further, in the present embodiment, a spacer is provided in a region (region of vertical×horizontal=Wx×Wy) of a cross point which is a region in which a first conductor 11X and a second conductor 21Y overlap with each other when the pointer detection sensor 1B is viewed in a direction orthogonal to the pointing inputting face 1BS side. In other words, in Patent Document 2, spacers are positioned in regions where the conductors do not exist. In the present embodiment, the spacers are positioned in cross points, instead of being positioned in regions where conductors do not exist or being positioned in regions where only one conductor exists.

Further, in the present embodiment, the spacer may be disposed at such a position, in such a shape and with such a height that the value of the deflection amount of the upper side substrate 10 by pressing by a pointer is higher in any other region than the region of a cross point than the value in the region of a cross point. In order to satisfy this condition, in the present embodiment, the spacer is disposed in a central region in the region of a cross point except a determined range from a peripheral edge thereof.

In the present example, spacers Sa, Sb, Sc and Sd are provided at the four corners of a region of a square shape of vertical×horizontal=Gx×Gy at the center of each of the regions of cross points of a square shape of vertical×horizontal=Wx×Wy as depicted in FIGS. 3 and 4. In the present example, Gx=Gy=1 mm. Accordingly, the distance from the peripheral edge of the central region of the square shape of vertical×horizontal=Gx×Gy to the peripheral edge of the region of a cross point of the square shape of vertical×horizontal=Wx×Wy is (Wx−Gx)/2=(Wy−Gy)/2= (2.5−1)/2=0.75 mm. The four spacers Sa to Sd are formed, for example, by printing a transparent dielectric material or by such a principle as in ink discharge of a dot printer. In this case, the material of the four spacers may be a hard material or a material having elasticity.

It is to be noted that, while, in FIG. 3, the spacers Sa to Sd existing on a second conductor 21Y are indicated by solid lines as they are seen through a transparent first conductor 11X, since the spacers Sa to Sd are transparent and small in size, they are seldom observable. This similarly applies also to the other figures represented in a similar manner as in FIG. 3.

Accordingly, within a region of a cross point, the distance between the four spacers Sa, Sb, Sc and Sd in the X direction and the Y direction is Gx and Gy.

Further, the distance tx in the X direction between the spacers corresponding to adjacent ones of the first conductors 11X, namely, between the spacer Sd or Sc of the first conductor 11Xi−1 and the spacer Sa or Sb of the adjacent first conductor 11Xi, is smaller than the array pitch Px (=3.2 mm) of the first conductors 11X, and is set greater than the spacing distance Gx in the X direction between the four spacers Sa, Sb, Sc and Sd in the region of a cross point. In other words, Gx<tx<Px is satisfied, and in the present example, the distance tx=2.2 mm.

Similarly, the distance ty in the Y direction between spacers corresponding to adjacent ones of the second conductors 21Y, namely, between the spacer Sb or Sc of the second conductor 21Yj−1 and the spacer Sa or Sd of the adjacent second conductor 21Yj is smaller than the array pitch Py (=3.2 mm) of the second conductors 21Y but is greater than the spacing distance Gy in the Y direction between the four spacers Sa, Sb, Sc and Sd in a region of a cross point. In other words, Gy<ty<Py is satisfied, and in the present example, the distance ty=2.2 mm.

In the case of Patent Document 2, since the spacers Sp are disposed in the regions which are other than the regions of the cross points and in which none of the first conductors 11X and the second conductors 21Y exist as described hereinabove, the distance between spacers in the X direction and the Y direction must be made equal to or greater than the array pitches Px and Py of the first conductors 11X and the second conductors 21Y, respectively. Therefore, in order to obtain a determined deflection amount of the upper side substrate 10 in each region of a cross point, the height of the spacers Sp is selectively set equal to or smaller than the distance between the first conductors 11X and the second conductors 21Y, for example, to 10 to 60 µm. Thus, the height of the spacers Sp is selectively set to a great height.

In contrast, in the present embodiment, the distances between the spacers in the X direction and the Y direction are set to 1 mm or 2.2 mm, which is smaller than the array pitches Px and Py (=3.2 mm) of the first conductors 11X and the second conductors 21Y as described hereinabove. Further, in the present embodiment, together with the fact that the spacers Sa, Sb, Sc and Sd are provided in a region of a cross point, the height H of the spacers Sa, Sb, Sc and Sd can be set to 4 to 10 which is low in comparison with that in the case of Patent Document 2. In the present example, the height H of the spacers Sa to Sd is H=6 µm.

The height H of the spacers Sa to Sd has a value with which a sufficient capacitance variation to carry out coordinate calculation of a pointed position by a pointer occurs before a first conductor 11X formed on the upper side substrate 10 is brought into contact with the spacers Sa to Sd. Accordingly, even if a first conductor 11X formed on the upper side substrate 10 is brought into contact with the spacers Sa to Sd and hence is placed into a state in which it is not deflected any more, since a necessary signal level sufficient for coordinate calculation at the point of time is obtained already, detection position coordinates of the pointer can be detected with high accuracy.

Since the spacers Sa, Sb, Sc and Sd are formed so as to have a small height in this manner, also the distance d between the first conductors 11X and the second conductors 21Y can be set smaller than that in the case of Patent Document 2. Incidentally, while, in the case of Patent Document 2, the distance between the first conductors 11X and the second conductors 21Y is 100 in the present embodiment, the distance d can be set to, for example, d=40 µm as described hereinabove.

The capacitance C of a capacitor can be calculated, where the area of two electrodes opposing to each other is represented by S, the distance between the two electrodes by D and the dielectric constant of the dielectric existing between the two electrodes by $\in$, in accordance with the following arithmetic expression:

$$C = \in \cdot S/D \qquad \text{(expression 1)}$$

In the present embodiment, since the distance D between the electrodes of the (expression 1) can be set smaller than that in the case of Patent Document 2, the value of the capacitance of a capacitor formed between a first conductor 11X and a second conductor 21Y can be made higher than that in the case of Patent Document 2.

Further, since the distance between the first conductors 11X and the second conductors 21Y can be set smaller, decrease of the optical transmittance can be suppressed, and the light transmittance can be set high in comparison with that in the case of Patent Document 2.

In this manner, since the present embodiment is configured such that the spacers Sa to Sd are disposed only at a central region portion of the region of a cross point while spacers do not need to be provided in any other region than the region of the cross point, the height of the spacers Sa to Sd can be set lower than that in the case of Patent Document 2. Consequently, the upper side substrate 10 and the first conductors 11X can be deflected and deformed by lower pressing force.

In particular, the pointer detection sensor of the present embodiment is configured such that, until the upper side substrate 10 and a first conductor 11X are brought into contact with the spacers Sa to Sd, the deflection of the upper side substrate 10 and the first conductor 11X by the pressing force is not limited. Consequently, pressing force, for example, from several tens of grams can be detected, and besides the detection coordinate accuracy of the pointed position to which the pressing force is applied is improved.

Besides, there is an effect also that, since the height of the spacers Sa to Sd is low, upon movement by pressing by a pointer, a rugged feeling by contact with tips of the spacers Sa to Sd may be moderated.

Further, in the present embodiment, the deflection amount of the upper side substrate 10 by pressing exhibits a higher value in any other region than the region of a cross point than in the region of the cross point as described above. Further, since the distance between adjacent ones of the spacers Sa to Sd is set so as to satisfy Gx<tx<Px and Gy<ty<Py as described hereinabove, the deflection amount of the upper side substrate 10 in any other region than the region of the cross point can be made greater. Accordingly, the detection accuracy of an applied position of pressing force by a pointer in the other regions than the regions of the cross points is improved. Especially, in the regions of cross points obliquely adjacent each other, since the distance between spacers is greater than the distance between spacers in the X direction and the Y direction, the detection sensitivity when a region which is other than the region of the cross point and in which none of the first conductors 11X and the second conductors 21Y exist is pressed by the pointer is improved.

In particular, with the pointer detection sensor of the embodiment described above, since it is configured in such a manner as described above, the problems described at the beginning of the description regarding Patent Document 2 can be reduced or eliminated. In the following, effects of the pointer detection sensor of the embodiment described above are described in more detail.

In the embodiment described above, the pointer detection sensor is structured such that it applies the principle of a capacitor represented by the arithmetic expression given by the (expression 1) to cause a significant variation of the capacitance formed between a first conductor 11X and a second conductor 21Y.

Figure 5:
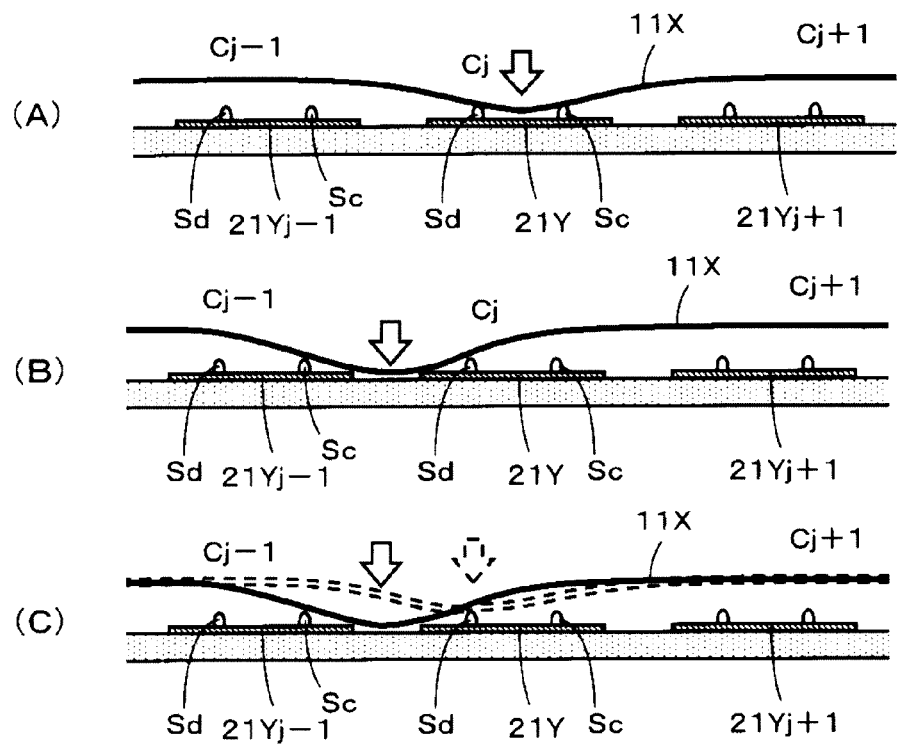
FIG. 5 is a view illustrating an operation upon application of pressing force using a pointer in an embodiment of the pointer detection sensor.

In the state in which the upper side substrate 10 is not pressed by a pointer, the first conductor 11x on the upper side substrate 10 and the second conductor 21Y on the lower side substrate 20 are spaced from each other by the determined distance d. If the upper side substrate 10 is pressed toward the lower side substrate 20 by a pointer, then since the upper side substrate 10 and the first conductors 11X individually have flexibility, the upper side substrate 10 and the first conductors 11X are deflected to the lower side substrate 20 side in the proximity of the location at which the pressing force is applied, for example, as depicted in FIGS. 4 and 5(A). Consequently, the distance between a first conductor 11X of the upper side substrate 10 at the deflected location and a second conductor 21Y of the lower side substrate 20 decreases in response to the applied pressing force from the distance d.

Consequently, as apparent from the (expression 1) given hereinabove, the capacitance of the capacitor formed from the first conductor 11X at the location to which the pressing force is applied and the second conductor 21Y of the lower side substrate 20 increases. In this case, the coordinates of the pointed position to which the pressing force is applied from the pointer are detected, in the present example, by a so-called three-point method. In particular, in FIG. 5(A), when the first conductor 11X is deflected, the distance between the first conductor 11X and three second conductors 21Yj−1, 21Yj and 21Yj+1 opposing to the first conductor 11X varies, and the capacitances Cj−1, Cj and Cj+1 of the capacitors configured from the first conductor 11X and the second conductors 21Yj−1, 21Yj and 21Yj+1 vary.

In the signal reception circuit 300 (refer to FIG. 2) of the pointer detection apparatus, signal levels corresponding to the values of the three capacitances Cj−1, Cj and Cj+1 are detected and are used to detect the Y coordinate of the pointed position to which the pressing is applied from the pointer. The X coordinate of the pointed position to which the pressing is applied by the pointer is detected from which one of the first conductors 11X a transmission signal is being supplied. Further, in the signal reception circuit 300 of the pointer detection apparatus, the pressing force by the pointer is calculated from the signal levels corresponding to the values of the capacitances Cj−1, Cj and Cj+1.

As described above, in the case of Patent Document 2, in a region location at which a spacer Sp is disposed other than the regions of cross points, even if pressing force is applied by a pointer, deflection corresponding to the applied pressing force does not occur. Further, also from the fact that the spacers are disposed in regions other than the regions of the cross points of the first conductors 11X and the second conductors 21Y, there is a problem that a capacitance with which coordinate values can be detected correctly cannot be obtained.

In contrast, in the present embodiment, since the spacers Sa to Sd are disposed only at central region locations in the regions of the cross points, also in any other region than the regions of the cross points, the upper side substrate 10 and the first conductors 11X are deflected by a greater amount than those in the regions of the cross points. Consequently, also when a pressing input by a pointer is provided to a region other than the regions of the cross points, capacitances from which a coordinate value can be detected correctly can be obtained.

In the present embodiment, if pressing force by a pointer is applied to a region other than the regions of the cross points as depicted in FIG. 5(B), then since no spacer exists in the region other than the regions of the cross points, a first conductor 11X formed on the upper side substrate 10 is deflected as depicted in the drawing by a great amount than that by which the first conductor 11X is deflected when the same pressing force is applied to the region of a cross point.

In particular, if the pressing force by a pointer is applied to just above the spacer Sd, then a first conductor 11X formed on the upper side substrate 10 is deflected to a position at the height of the spacer Sd as indicated by a broken line in FIG. 5(C). However, if the same pressing force from a pointer is applied to any other region than the region of the cross point, then the first conductor 11X is deflected as indicated by a solid line (same as in FIG. 5(B)).

Then, as depicted in FIGS. 5(B) and 5(C), in any other region than the regions of the cross points, even if a first conductor 11X is deflected by a great amount and approaches the lower side substrate 20 side, since no second conductor 21Y exists just below the location, the deflection of the first conductor 11X provides a variation to the second conductors 21Y located on the opposite sides of the region and the capacitance of the capacitors.

Further, as apparent from FIG. 5(C), in the present embodiment, the deflection amount of a first conductor 11X in a region other than the regions of the cross points is greater than the deflection amount of the first conductors 11X in the regions of the cross points. Therefore, the variation of the capacitance with respect to pressing force by a pointer can be made similar between the regions of the cross points and any other region than the regions of the cross points.

Figure 6:
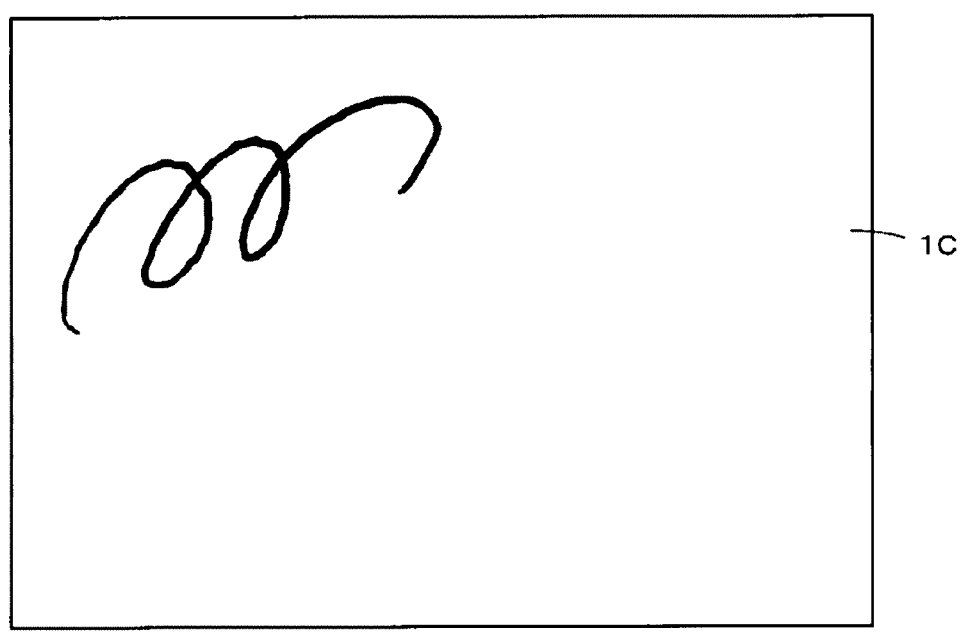
FIG. 6 is a view illustrating an effect when an embodiment of the pointer detection sensor is used.
Figure 32:
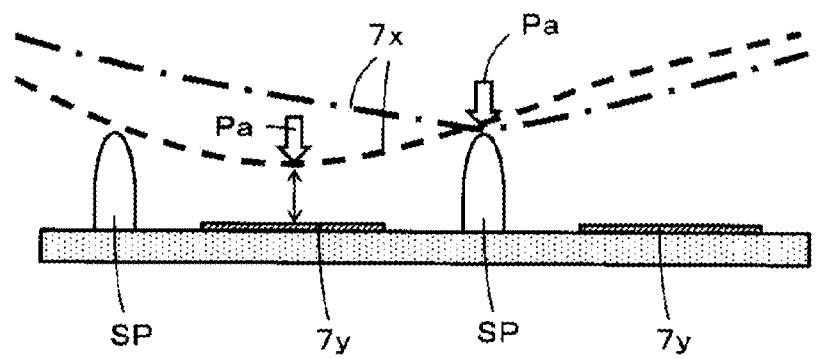
FIG. 32 is a view illustrating an example of the pointer detection sensor proposed previously.
Figure 33:
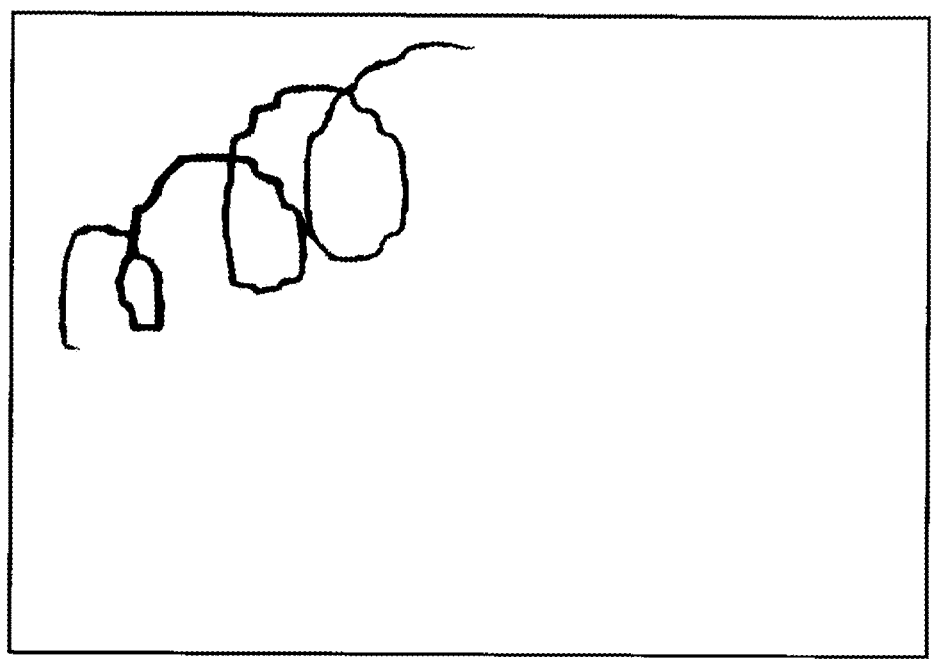
FIG. 33 is a view illustrating an example of the pointer detection sensor proposed previously.

Therefore, according to the present embodiment, the problem of the accuracy of the coordinates of the pointed position at which pressing force by a pointer is applied in the case of Patent Document 2 described hereinabove with reference to FIGS. 32 and 33 can be moderated. Incidentally, in the present embodiment, if a spirally tracing operation similar to that in FIG. 33 is performed, then such a smooth curve as depicted in FIG. 6 can be displayed on the display screen of the LCD 1C.

Figure 7:
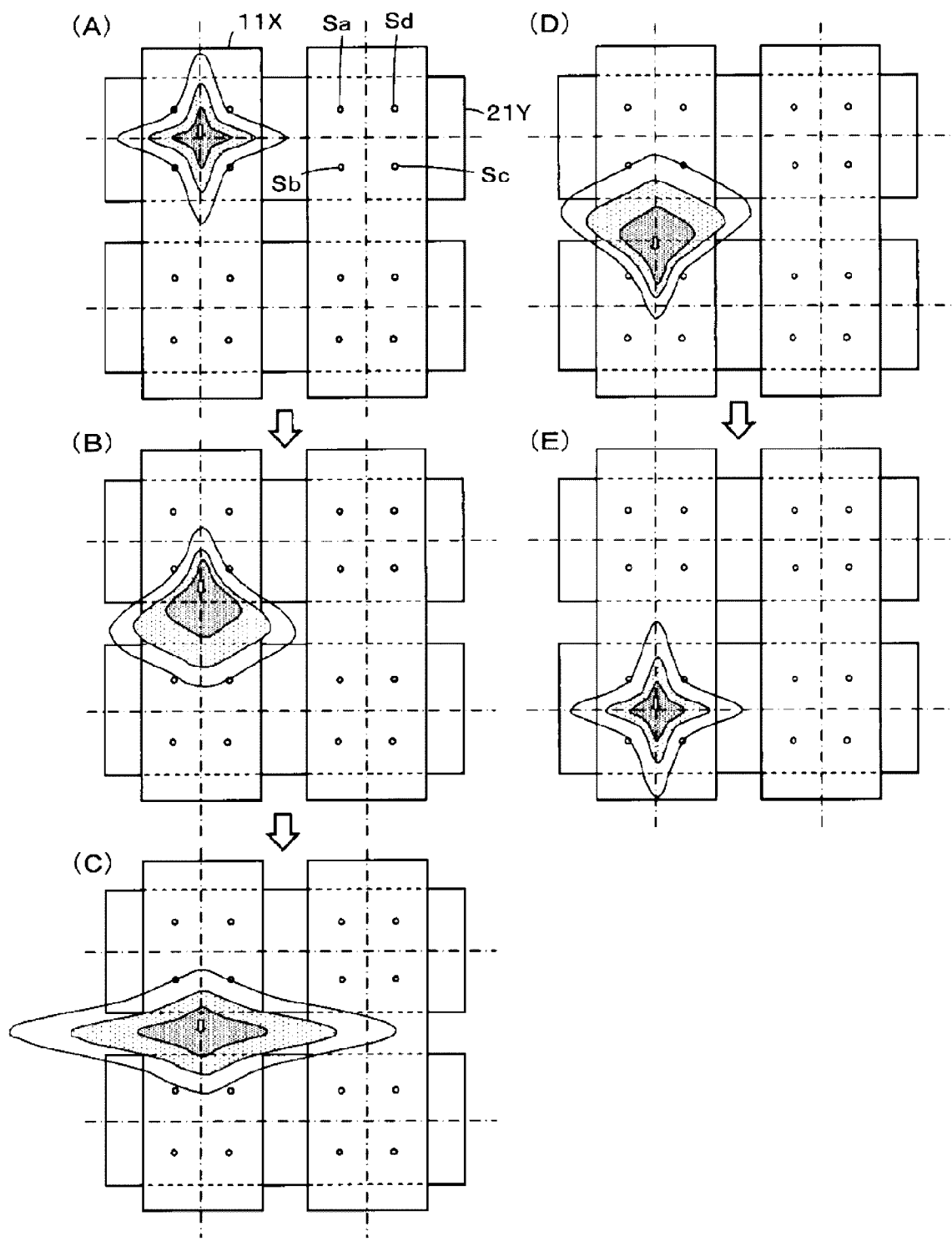
FIG. 7 is a view illustrating deflection of an upper side substrate when pressing force is applied thereto from the pointer in an embodiment of the pointer detection sensor.
Figure 8:
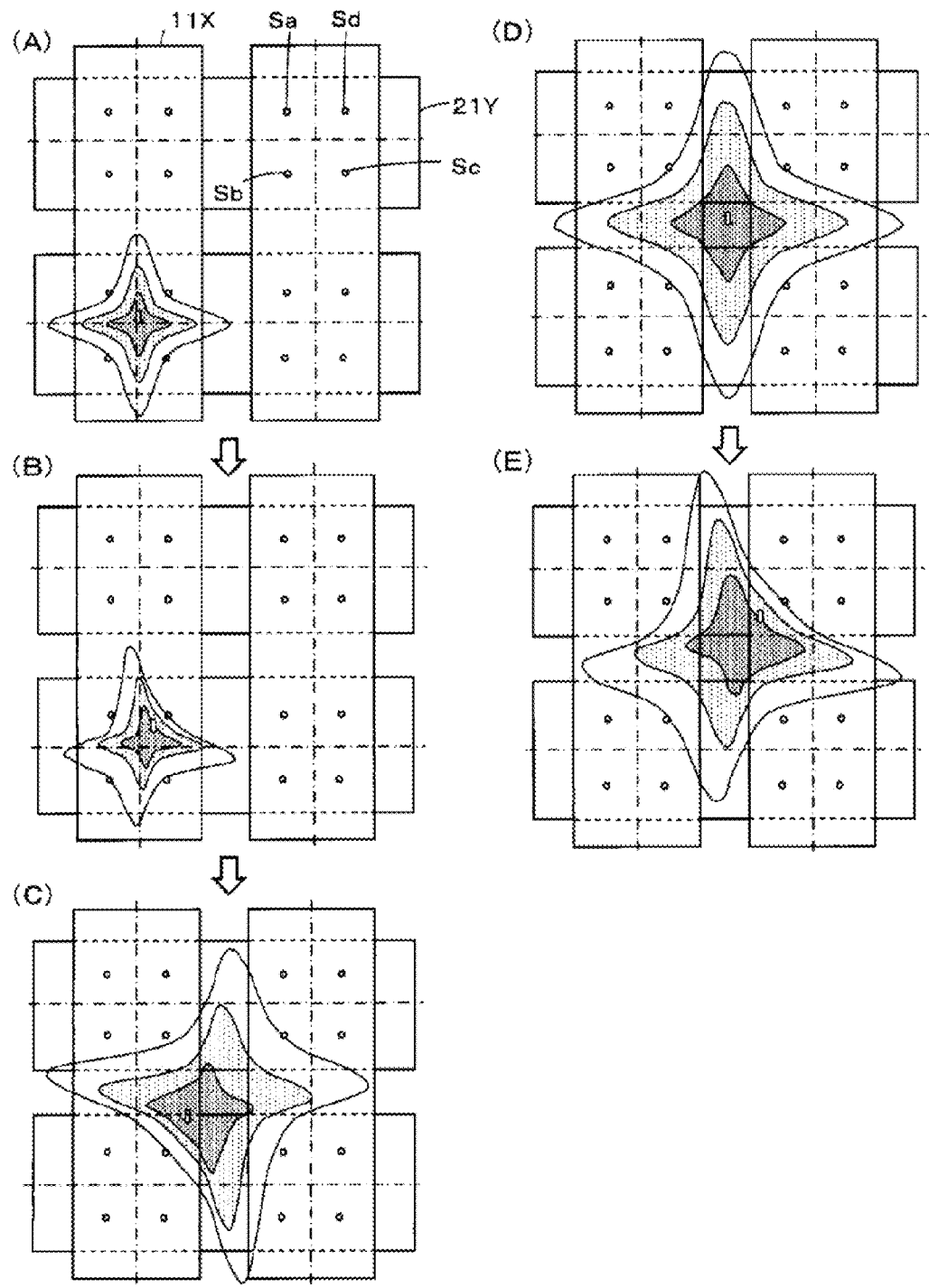
FIG. 8 is a view illustrating deflection of the upper side substrate when pressing force is applied thereto from the pointer in an embodiment of the pointer detection sensor.
Figure 9:
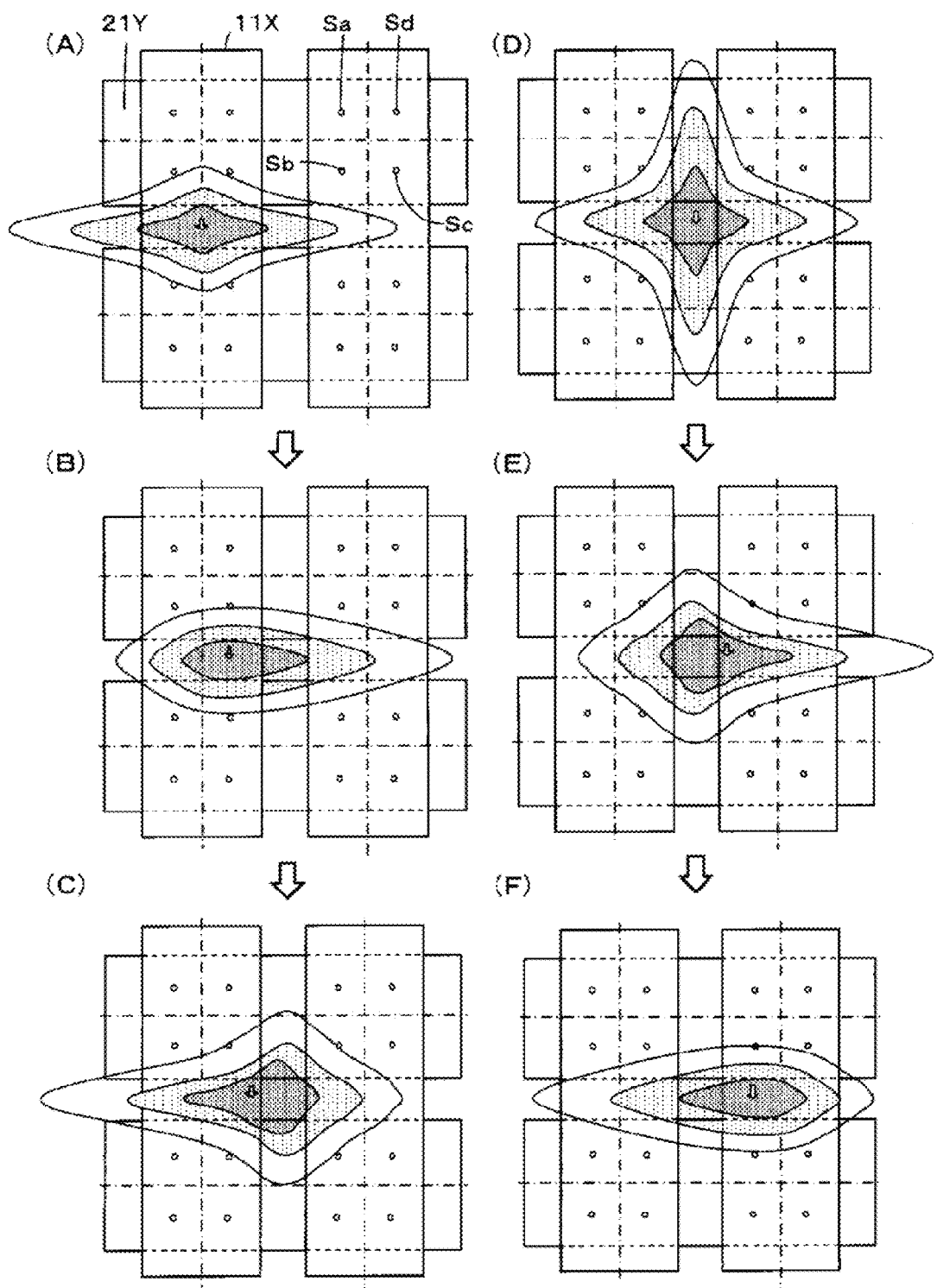
FIG. 9 is a view illustrating deflection of the upper side substrate when pressing force is applied thereto from the pointer in an embodiment of the pointer detection sensor.

Distribution diagrams of the deflection amount in the pointer detection sensor 1B of the present embodiment in regard to in what manner a pressed portion of the upper side substrate 10 and a first conductor 11X is deformed when the upper side substrate 10 and the first conductor 11X are pressed by a pointer are depicted in FIGS. 7 to 9. In FIGS. 7 to 9, the position of a small hollow arrow mark in the distribution diagrams indicates a position at which pressing by a pointer is applied. Further, the deflection amount of the upper side substrate 10 and the first conductor 11X is indicated like contour lines by interconnecting positions of the same deflection amounts. Further, as the deflection amount increases, the inside of the counter line is filled with a denser shadow. It is to be noted that, in FIGS. 7 to 9, a manner when pressing is performed by a pointer having a pointed end like the core of the mechanical pencil is depicted.

FIGS. 7(A) to 7(E) are views depicting a variation of the deflection amount in a positional relationship with the spacers Sa to Sd when the application position of the pressing force by a pointer moves on one first conductor 11X. Also the variation of the deflection amount in the positional relationship with the spacers Sa to Sd when the application position of the pressing force by the pointer moves along one second conductor 21Y is similar in the moving direction of the application position of the pressing force by the pointer.

Meanwhile, FIGS. 8(A) to 8(E) are views depicting a variation of the deflection amount in a positional relationship with the spacers Sa to Sd when the application position of the pressing force by a pointer moves in an obliquely upward direction on the upper side substrate 10 of the pointer detection sensor 1B.

Further, FIGS. 9(A) to 9(F) are views depicting a variation of the deflection amount in a positional relationship with the spacers Sa to Sd when the application position of the pressing force by a pointer moves in the X direction in a region which is a region other than the regions of the cross points and between two adjacent ones of the second conductors 21Y. Also the variation of the deflection amount in a positional relationship with the spacers Sa to Sd when the application position of the pressing force by the pointer moves in the Y direction in a region which is a region other than the regions of the cross points and between two adjacent ones of the first conductors 11X is similar in the moving direction of the application position of the pressing force by the pointer.

As apparent from FIGS. 7 to 9, according to the configuration of the pointer detection sensor 1B of the present embodiment, also when a region other than the regions of the cross points is pressed by a pointer, deformation of the upper side substrate 10 and a first conductor 11X by deflection is transmitted to a region of a cross point at which the first conductor 11X and a second conductor 21Y overlap with each other. In other words, also when a region other than the regions of the cross points is pressed by a pointer, a variation of the detection level based on the capacitance occurs in the region of the cross point. Therefore, with the pointer detection sensor of the present embodiment, coordinate detection with a high degree of accuracy of a position pointed to by pressing by a pointer can be carried out at all positions of the pointing inputting face 1BS, and also detection of the pressing force by the pointer then can be carried out.

While the foregoing description is directed principally to the deflection of the upper side substrate 10 and the first conductors 11X by pressing force by a pointer in a region other than the regions of the cross points, a manner when the region of a cross point is pressed by a pointer having a thin and pointed tip like the core of the mechanical pencil similarly as in the foregoing description is described below.

Figure 10:
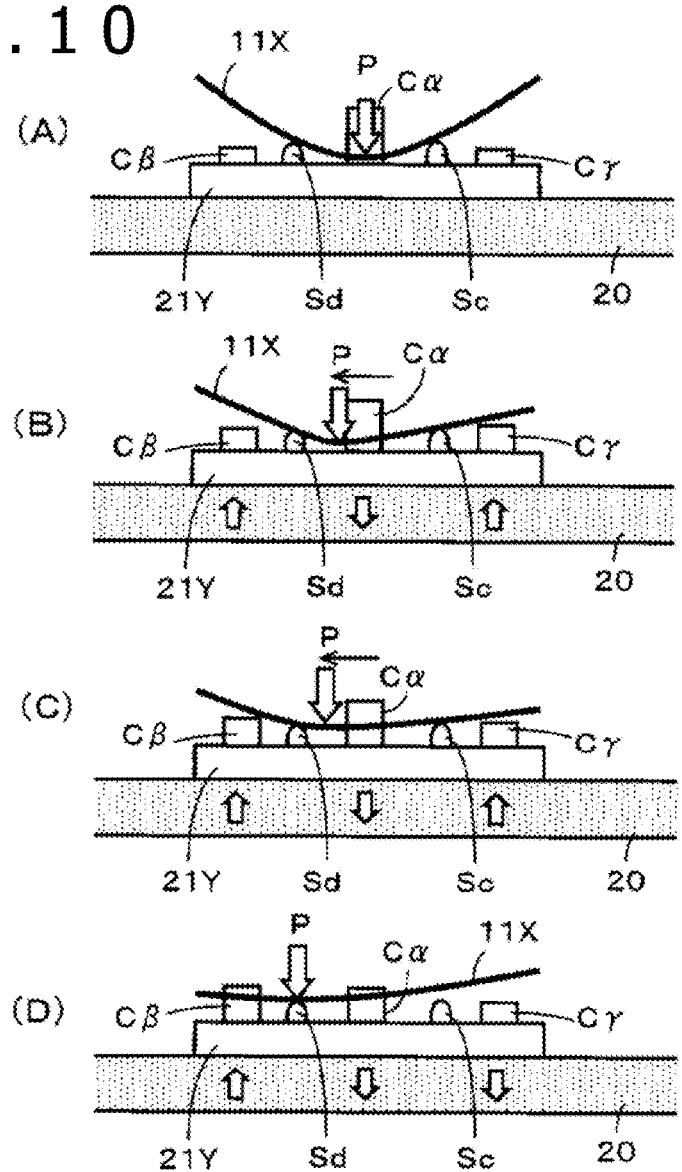
FIG. 10 is a view illustrating a variation in the capacitance between a first conductor and a second conductor when pressing force is applied from the pointer in an embodiment of the pointer detection sensor.

In particular, FIGS. 10(A) to 10(D) depict manners of deflection of a first conductor 11X when a central region in the region of a cross point is pressed by pressing force P by a pointer having a thin and pointed tip like the core of the mechanical pencil and besides the pressing position is moved from the center position of the central region in the region of the cross point to the positions just above the spacers Sa to Sd in outer periphery directions as indicated by horizontally directed arrow marks (refer to FIGS. 10(B) and 10(C)). In FIG. 10, the upper side substrate 10 is omitted for simplification.

Further, it is assumed that, in FIGS. 10(A) to 10(D), a capacitance generated between a first conductor 11X and a second conductor 21Y in the region of a cross point is divided into a capacitance Cα of a capacitor in the central region surrounded by the spacers Sa to Sd and capacitances Cβ and Cγ of capacitors on the opposite sides outside the central region surrounded by the spacers Sa to Sd and that the three capacitors are connected in parallel. It is to be noted that, in FIG. 10, the capacitances Cα, Cβ and Cγ are schematically indicated by quadrangles and the height of each quadrangle corresponds to the capacitance value. In this case, the capacitance generated between the first conductor 11X and the second conductor 21Y in the region of the cross point can be regarded as the sum of the three capacitances Cα, Cβ and Cγ.

In this case, as depicted in FIGS. 10(A) to 10(D), the variation of the deflection amount of the first conductor 11X by a movement of the pointer operates in the opposite directions between the central region in the region of the cross point and the regions outside the central region on the opposite sides of the central region until the pressing position comes to the position just above any of the spacers Sa to Sd. In particular, as depicted in FIGS. 10(B) and 10(C), the distance between the first conductor 11X and the second conductor 21Y increases in the central region in the region of the cross point, but decreases in the regions outside the central region on the opposite sides of the central region. Therefore, also the three capacitances Cα, Cβ and Cγ vary in response to the variation of the distance, and consequently, the combined capacitance of them little varies. In FIGS. 10(B), 10(C) and 10(D), arrow marks indicated in the lower side substrate 20 represent whether the three capacitances Cα, Cβ and Cγ increase (upwardly directed arrow mark) or decrease (downwardly directed arrow mark) in comparison with those at the preceding stage.

Accordingly, in the pointer detection sensor 1B of the present embodiment, even if the pressing position by the pointer moves from the center position in the central region in the region of the cross point in an outward direction to a position just above any of the spacers Sa to Sd, the capacitance in the overall region of the cross point exhibits little variation. Consequently, a stable detection signal level of a pointer can be obtained and the detection coordinate accuracy of the pointer position is improved.

It is to be noted that a deflection of the first conductor 11X in FIGS. 10(A) to 10(D) is illustrated in an emphasized fashion. Further, the influence of the deflection by pressing on the first conductor 11X almost falls within the range of the region of the cross point and is not so significant as to have an influence on the region of any other cross point.

Figure 11:
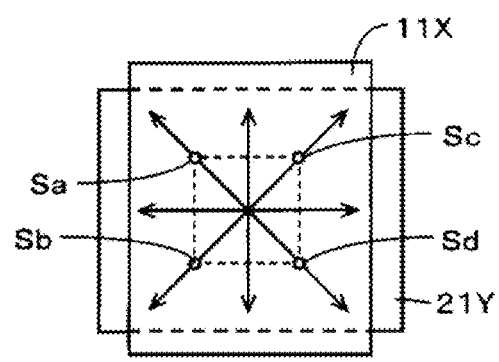
FIG. 11 is a view illustrating a variation in the capacitance between the first conductor and the second conductor when pressing force is applied from the pointer in an embodiment of the pointer detection sensor.

It is to be noted that, although what is described with reference to FIG. 10 is a case in which the pressing position of a pointer moves in a lengthwise direction (longitudinal direction) of the first conductor 11X, this similarly applies also to where the pressing position of a pointer moves not only in a longitudinal direction but also in a lateral direction or an oblique direction as indicated by arrow marks in FIG. 11.

The positions at which the spacers Sa to Sd are disposed and the height of them may be set so that the variation in capacitance caused by deflection of the first conductor 11X when the first conductor 11X is pressed by a pointer at an arbitrary position in the region of the cross point described above may not occur as far as possible. Consequently, the influence of the provision of the spacers Sa to Sd upon the signal detection level in the region of the cross point is suppressed to the minimum.

Further, in the pointer detection sensor according to the embodiment described above, the upper side substrate 10 and the lower side substrate 20 are bonded to each other by the bonding member 30 of a framework shape along peripheral portions thereof and the air is sealed between the upper side substrate 10 and the lower side substrate 20. The sealed confined air is subject to a pressure variation in response to pressing by a pointer, and the variation of the capacitance can be increased by the pressure variation. This is described with reference to FIG. 12. Here, a curve opposing to the lower side substrate 20 in FIG. 12(A) indicates a deflective variation of a first conductor 11X formed on the upper side substrate 10 by pressing force P by a pointer, and a curve opposing to the lower side substrate 20 in FIG. 12(B) indicates a variation of the capacitance C generated in response to the deflective variation of the first conductor 11X.

In particular, if the upper side substrate 10 is pressed by the pressing force P as depicted in FIG. 12(A), then the pressed portion of the upper side substrate 10 is depressed and the volume of the air enclosed in the inside of the portion decreases. However, since the air between the upper side substrate 10 and the lower side substrate 20 is sealed, as the volume is decreased by the pressing, the pressure of the inside air increases and force in the reverse direction to that of the pressing force P is generated in a region in which the upper side substrate 10 is not pressed.

Consequently, at the location to which the pressing force P is applied, the distance between the upper side substrate 10 and the lower side substrate 20 decreases as depicted in FIG. 12(A). Consequently, the capacitance C between the first conductor 11X and the second conductor 21Y increases from that before the application of the pressing force as depicted in FIG. 12(B). However, at locations on the opposite sides of the pressed position pressed back by the force in the reverse direction to that of the pressing force P, the distance between the upper side substrate 10 and the lower side substrate 20 increases as depicted in FIG. 12(A). Consequently, the capacitance C at the locations decreases from that before the application of the pressing force as indicated in FIG. 12(B).

Since the upper side substrate 10 and the first conductors 11X indicate differential deflective displacement between the location at which the pressing force P is applied and the locations on the opposite sides of the location in this manner, the accuracy when the coordinates of a position pressed by a pointer are calculated by the three-point method is improved.

The pointer detection apparatus disclosed in Patent Document 2 described hereinabove cannot achieve detection with high accuracy also where it has the hybrid type configuration described above. In particular, in the first mode, detection of the position of a pointer is possible irrespective of the spacer. On the other hand, in the second mode, although detection can be carried out evenly, it is apparent from FIG. 31 that a difference in detection of pressing appears from an influence of a spacer, which is an obstacle, between a case in which a region just above the spacer is pressed by a pointer and another case in which a region of a cross point at which the spacer does not exist is pressed. Accordingly, the conventional hybrid type pointer detection apparatus is inferior in accuracy. In contrast, in the present embodiment which depends upon a spacer disposed in a region of a cross point is improved in accuracy in the second mode, which makes it possible to implement the pointer detection apparatus of the hybrid type.

Hybrid Type Configuration of Pointer Detection Apparatus 1 of First Embodiment

As described above, the pointer detection apparatus 1 of the first embodiment which includes the pointer detection sensor 1B having the configuration described above is configured such that the first mode (electrostatic dealing mode) in which a processing operation for detecting a pointed position and pressing force by a pointer having conductivity and configured from a finger of a person or a so-called electrostatic pen is carried out and the second mode (non-electrostatic mode) in which a processing operation for detecting a pointed position and pressing force by a finger of a user who wears a rubber glove or a pen type pointer having no conductivity is carried out are repeated alternately every determined time period T as depicted in FIG. 13.

Here, the determined time period T can be made, for example, a time period of one half the time period within which a transmission signal is supplied to a transmission conductor (in the present example, a first conductor 11X). In particular, the mode is switched from first to second between a front half and a rear half of the time period within which a transmission signal is supplied to a transmission conductor. If a transmission signal is successively supplied to one by one of transmission conductors, then the mode is switched from first to second between the front half and the rear half of the time period within which the transmission signal is supplied to one transmission conductor. However, if a transmission signal is supplied at the same time to a unit of plural transmission conductors, then the mode is switched from first to second between the front half and the rear half of the time period within which the transmission signal is supplied to the unit of the plural transmission conductors.

Alternatively, the determined time period T may be set to a time period required to supply a transmission signal to all transmission conductors (in the present example, to all first conductors 11X) which configure the pointer detection sensor 1B and carry out processing of reception signals from reception conductors (in the present example, from the second conductors 21Y) in response to the transmission signal until a calculation process for detecting a pointed position and pressing force by a pointer on the pointing inputting face 1BS is completed. In particular, in this case, the first mode and the second mode are switched for every one time of detection of a pointed position and pressing force by a pointer over the overall area of the pointing inputting face 1BS. It is to be noted that the first mode and the second mode may otherwise be switched not after every one time of detection but every plural times of detection of a pointed position and pressing force by a pointer over the overall area of the pointing inputting face 1BS.

Description of First Mode (Electrostatic Dealing Mode)

Figure 15:
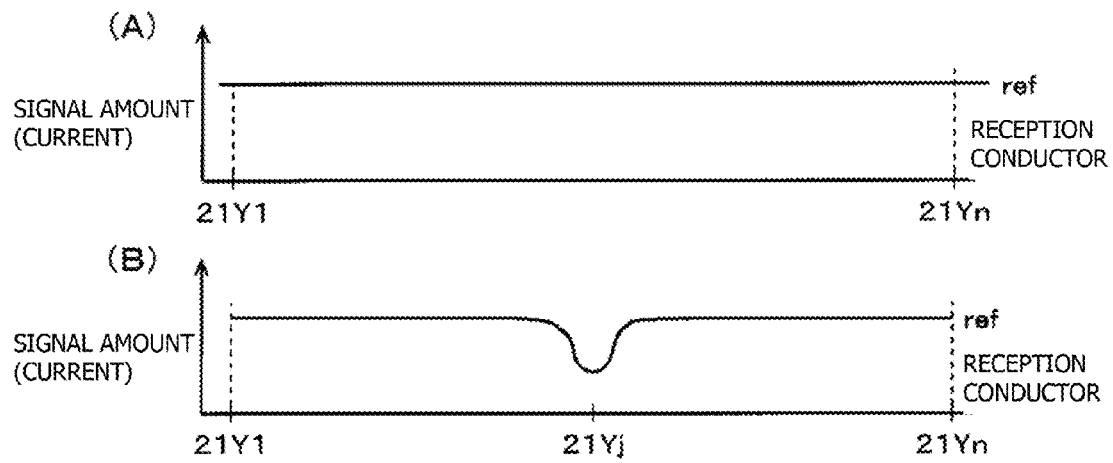
FIG. 15 is a view illustrating detection by one of the pointers of different types in an embodiment of the pointer detection apparatus.

When a pointer such as a finger does not exist on the pointing inputting face 1BS which is the surface of the upper side substrate 10 of the pointer detection sensor 1B, in response to a transmission signal (voltage signal) supplied to a transmission conductor, in the present example, to a first conductor 11X, current flows to the capacitance Co in a region of a cross point between a reception conductor, in the present example, a second conductor 21Y and the transmission conductor (first conductor 11X). Thus current flows to the second conductor 21Y and is supplied as a reception signal (current signal) to the signal reception circuit 300. Since this is similar to the regions of all cross points of the pointing inputting face 1BS, when a pointer such as a finger or an electrostatic pen does not exist on the pointing inputting face 1BS, reception signals of an equal level (equal current value) are supplied from all of the second conductors 21Y1 to 21Yn to the signal reception circuit 300 as depicted in FIG. 15(A). It goes without saying that this state is similar not only in the first mode but also in the second mode.

Then, if an electrostatic pen as an example of a pointer 15 is placed at a position of the pointing inputting face 1B S at which it does not contact with but is close to the pointing inputting face 1B S (so-called hovering state) or is placed at a position at which it contacts with the pointing inputting face 1BS as depicted in FIG. 14 to carry out pointing inputting, then at the pointing inputting position, a capacitance Cfa or Cfb (it is to be noted that this includes an electrostatic capacitance of the body of a person who holds the pointer 15 by hand) is generated by coupling between the pointer 15 and a second conductor 21Y. Consequently, in the region of a cross point corresponding to the pointing inputting position by the pointer 15, part of current which is to flow to the capacitance Co in response to the transmission signal (voltage signal) is lost through the capacitance Cfa or Cfb.

As a result, the current which flows to the second conductor 21Y at the pointing inputting position by the pointer 15 decreases from the value ref (this is a reference value) when the pointer 15 does not exist as depicted in FIG. 15(B).

In the signal reception circuit 300, the current variation decreasing from the reference value ref is detected to detect that the pointer 15 is brought to a position spaced from the pointing inputting face 1BS or is placed at a contacting position. Then, the signal reception circuit 300 detects the position of the cross point at which the decreasing current variation occurs thereby to detect the pointing inputting position by the pointer 15 from the position at which the pointer 15 is spaced from the pointing inputting face 1BS to the contacting position.

Figure 16:
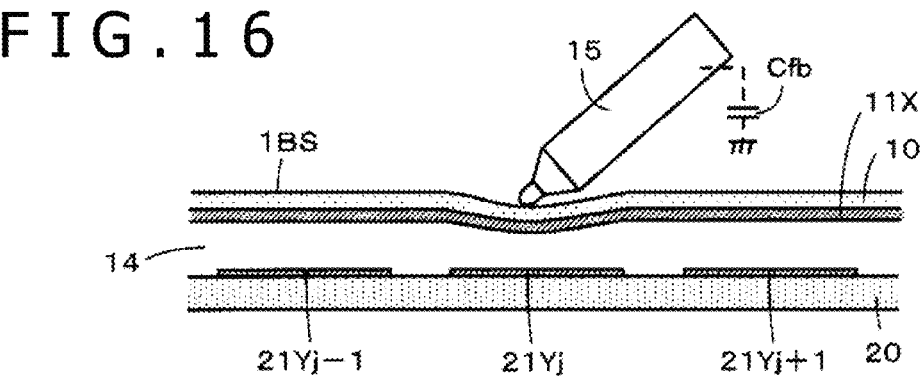
FIG. 16 is a view illustrating detection by one of the pointers of different types in an embodiment of the pointer detection apparatus.

Then, if the pointer 15 is further moved from the state in which it contacts with the pointing inputting face 1BS to another state in which it presses the pointing inputting face 1BS, then the portion of the upper side substrate 10 to which the pressing force is applied is deflected as depicted in FIG. 16, whereupon the distance between the first conductor 11X and the second conductor 21Y decreases and the capacitance between the two electrodes increases by an amount corresponding to the pressing force from the capacitance Co. Then, if the pressing force applied by the pointer 15 increases until the increasing variation amount of the capacitance between the first conductor 11X and the second conductor 21Y exceeds the capacitance Cfb, then the amount of current flowing through the capacitance between the first conductor 11X and the second conductor 21Y becomes greater than the amount of current which has been lost through the capacitance Cfb.

Figure 17:
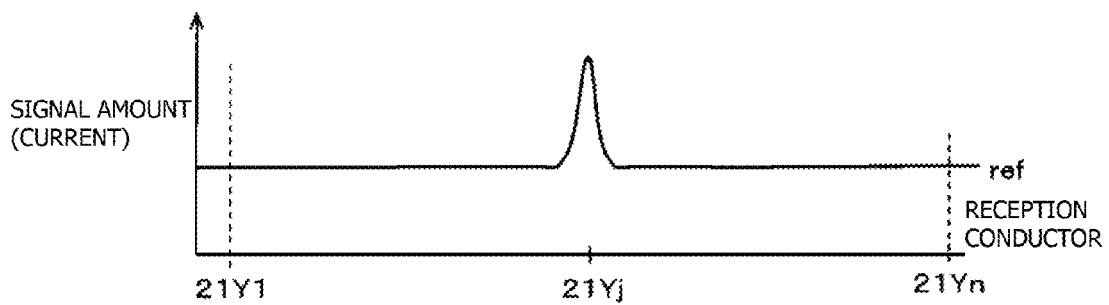
FIG. 17 is a view illustrating detection by one of the pointers of different types in an embodiment of the pointer detection apparatus.

As a result, as depicted in FIG. 17, the current flowing to the second conductor 21Y at the pressing position by the pointer 15 increases exceeding the reference value ref when the pointer 15 does not exist.

The signal reception circuit 300 detects the position at which the current variation increasing exceeding the reference value ref is generated to detect the position of the pointing inputting face 1BS at which the pointing inputting face 1BS is pressed by the pointer 15 and detect the pressing force from the increasing amount from the reference value ref.

Description of Second Mode (Non-Electrostatic Mode)

Since the pointer of the detection target in the second mode is not a conductor as described hereinabove, the pointer detection apparatus 1 in the second mode does not detect a hovering state and a contacting state of the pointer.

Further, in the present second mode, if the pointing inputting face 1BS is pressed by the pointer and the distance between a first conductor 11X and a second conductor 21Y decreases, then current flowing to the second conductor 21Y at the pressing position by the pointer 15 increases from the reference value ref when no pressing force applied by the pointer as described hereinabove with reference to FIG. 17.

Further, in the present second mode, the signal reception circuit 300 detects a position at which a current variation increasing from the reference value ref is generated to detect the position at which the pointing inputting face 1BS is pressed by the pointer and detect the pressing force from the increasing amount from the reference value ref.

Switching Between First Mode and Second Mode

The control circuit 40 of the signal reception circuit 300 time-divisionally switches the processing operation of the pointed position and pressing force detection circuit 33 between a processing operation for the first mode and a processing operation for the second mode every determined time period T described hereinabove. Further, the control circuit 40 controls the gain of the amplification circuit 31 to be changed between the first mode and the second mode.

The control of the gain arises from the following reason. In particular, in the first mode, the state in which the current amount increases as depicted in FIG. 17 appears at a point of time at which the variation amount of the increasing capacitance between a first conductor 11X and a second conductor 21Y becomes greater than the capacitance Cfb. In contrast, in the second mode, the state appears at a point of time at which pressing force is applied to the pointing inputting face 1BS by a pointer. In other words, in the first mode, in order to establish a state in which the current amount increases as depicted in FIG. 17, the pressing force (writing pressure) to be applied by the pointer requires an offset corresponding to the variation amount of the capacitance corresponding to the capacitance Cfb. On the other hand, in the second mode, such an offset as just described is not involved.

Therefore, in the first mode, the control circuit 40 controls the gain of the amplification circuit 31 to increase by an amount corresponding to the offset described above in comparison with that in the second mode. Consequently, in the pressing force detection process in a direction in which the reception signal level increases exceeding the reference value ref as depicted in FIG. 17, the characteristic of the pressing force versus reception signal level is corrected so as to be substantially same between the first mode and the second mode.

It is to be noted that, in the present embodiment, the pointed position and pressing force detection circuit 33 distinctly manages the position of a pointer detected in the first mode and the position of a pointer detected in the second mode so that detection of the detected pointer according to later positional movement and pressing force variation can be carried out in response to the type of the pointer. For the distinctly managing method, a method of using a buffer memory for storing the position of a pointer detected in the first mode and a different buffer memory for storing the position of a pointer detected in the second mode, another method of using a common buffer memory and storing position information of a pointer detected in the first mode and position information of another pointer detected in the second mode with different pieces of identification information added thereto and so forth can be used.

Modifications to First Embodiment

As for the spacers, in the description of the first embodiment described above, four spacers Sa to Sd are disposed at the four corners of a square region at the center of a region of a cross point. However, the spacers are not limited to those of the example described above only if they are disposed at a central region in a region of a cross point, but the number of such spacers may be one or such a plural number as in the example described above.

FIGS. 18(A) and 18(B) depict an example in which one spacer is disposed in a central region in a region of a cross point. In the example, a spacer Se having a height equal to that of the spacers Sa to Sd and configured from a flattened thin columnar body is disposed over the overall area of a square region surrounded by the four spacers Sa to Sd described hereinabove.

It is to be noted that the shape of the single spacer is not limited to a quadrangular prism shape as in the example of FIG. 18 but may be a polygonal prism shape or a cylindrical shape.

However, in this case, the single spacer for example has such a shape that it has a same distance relationship to the four peripheral sides of the region of the cross point. This is because it is intended to cause the deflective deformation of the upper side substrate 10 and a first conductor 11X to be similar in the directions from the central position in the region of the cross point to the four peripheral sides of the region thereby to prevent deterioration of the coordinate calculation accuracy of a pointer caused by difference in deflective deformation depending on the directions.

Meanwhile, FIGS. 18(C) and 18(D) depict another example in the case where a plurality of spacers are provided in a region of a cross point. In the present example, spacers Sf, Sg, Sh and Si are disposed individually at the four corners of a quadrangular region inclined by 45 degrees with respect to a region of a cross point of a quadrangular shape in a central region of the region of the cross point.

The number of plural spacers is not limited to four as in the example described above. Fewer or more spacers may be possible. However, also in this case, the disposition number and the disposition positions of the plurality of spacers may be determined so that they have a same distance relationship individually to the four peripheral sides of the region of the cross point. Further, the distances in the X direction and the Y direction (which correspond to the distances tx and ty in FIG. 3) of the spacers in regions of cross points adjacent each other may be set so as to satisfy the condition that they are greater than the distances in the X direction and the Y direction (which correspond to Gx and Gy in FIG. 3) of spacers in the region of the same cross point. Consequently, the deflection amount of the upper side substrate 10 and a first conductor 11X exhibits a higher value in any other region than the region of the cross point than a value in the central region of the region of the cross point.

As regards the shape of the spacers, such a flattened end face as depicted in FIGS. 18(A) and 18(B) need not be a flat face, and such a tip as depicted in FIGS. 18(C) and 18(D) need not have an acute shape but may have a so-called divergent shape. For example, FIGS. 18(E) and 18(F) depict an example in the case wherein a single circular spacer is disposed in a region of a cross point. In this example, a divergent dome-shaped spacer Sj is disposed along a circumferential edge portion of the region of a cross point.

It is to be noted that a plurality of spacers may not only be disposed on a peripheral portion of a central region but be disposed in both of a peripheral portion of the central region and the inside of the central region.

Further, although the spacers may be configured from a hard material, they may otherwise be configured from an elastic material. Where the spacers are configured from an elastic material, a first conductor 11X and a second conductor 21Y can move more closely toward each other by the pressing force by a pointer. Consequently, further improvement in sensitivity can be anticipated.

It is to be noted that, while, in the embodiment described above, the spacers are formed on the second conductors 21Y, it is a matter of course that, even if the spacers are formed on the first conductors 11X, similar working-effects can be anticipated.

It is to be noted that the pointer detection apparatus 1 of the embodiment described above is configured as a hybrid type apparatus which executes the first mode and the second mode time-divisionally such that pointers of two types can be detected without difference. However, a mode switching button may be provided on the pointer detection apparatus 1 such that the mode is switched between the first mode and the second mode in response to a used pointer so that the pointer detection apparatus 1 can be used as an apparatus for exclusive use for each of the modes.

Second Embodiment

In the first embodiment described above, an air layer is enclosed between the first conductors 11X formed on the upper side substrate 10 and the second conductors 21Y formed on the lower side substrate 20. However, where the gap between the upper and lower electrodes is an air layer, reflection occurs at the air layer and the transmittance of light drops. The drop of the transmittance of light may not be preferable because it decreases the luminance of the display surface of an LCD disposed at a lower portion of the pointer detection sensor in the pointer detection apparatus.

Therefore, in the second embodiment, a transparent elastic resin material is enclosed in place of the air layer between the first conductors 11X formed on the upper side substrate 10 and the second conductors 21Y formed on the lower side substrate 20 to improve the optical characteristic. Except this point, the configuration of the pointer detection sensor of the second embodiment is same as that of the first embodiment described hereinabove. Accordingly, same portions to those of the first embodiment described above are denoted by same reference symbols, and the present second embodiment is described below.

In this case, if a fabrication method is adopted wherein a transparent elastic resin material is enclosed after spacers are disposed in the regions of cross points on the first conductors 11X or the second conductors 21Y, then the man-hour increases and the cost increases.

Therefore, in the second embodiment, a fabrication method is used wherein an optically elastic resin (OCR (Optical Clear Resin/LOCA, hereinafter referred to as OCR) of the UV-curable type is used as the transparent elastic resin and is enclosed between the first conductors 11X formed on the upper side substrate 10 and the second conductors 21Y formed on the lower side substrate 20, where after only portions of the OCR corresponding to the spacers are cured.

In this case, although the OCR is fully cured at the portions corresponding to the spacers, at the other portions than the spacers, in one case, the OCR is left as it is as fluid not cured at all, and in another case, the OCR is semi-cured so as to remain in a gel state or a sol state.

The OCR enclosed between the upper side substrate 10 and the lower side substrate 20 is used, in one case, to form spacers up to a determined height similarly as in the first embodiment described hereinabove (first fabrication method) and, in another case, to form spacers so as to bridge the upper side substrate 10 and the lower side substrate 20 (second fabrication method).

Description of First Fabrication Method

First, the first fabrication method wherein spacers are formed up to a determined height is described.

First, first conductors 11X are formed on one face side of an upper side substrate 10, and second conductors 21Y are formed on one face side of a lower side substrate 20. Then, the upper side substrate 10 and the lower side substrate 20 are placed such that, in a state in which the first conductors 11X and the second conductors 21Y extend perpendicularly to each other, the face of the upper side substrate 10 on which the first conductors 11X are formed and the face of the lower side substrate 20 on which the second conductors 21Y are formed are opposed to each other in a spaced relationship from each other by the determined distance d described hereinabove (refer to FIG. 19(A)).

Figure 19:
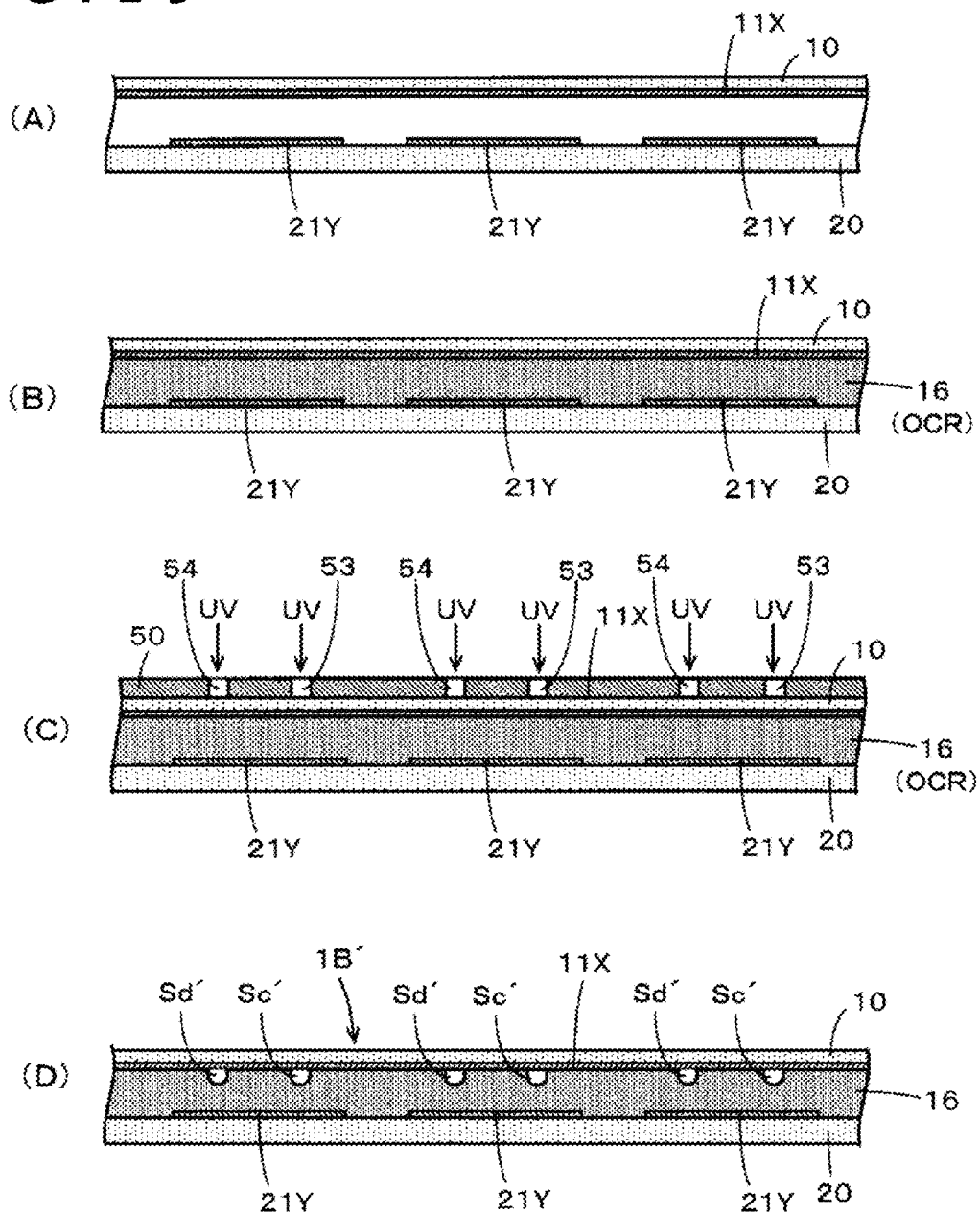
FIG. 19 is a view illustrating a first fabrication method of an embodiment of a pointer detection sensor.

Then, OCR 16 in the state of liquid before curing is filled into the gap of the distance d between the upper side substrate 10 on which the first conductors 11X are formed and the lower side substrate 20 on which the second conductors 21Y are formed (refer to FIG. 19(B)). Then, peripheral portions of the upper side substrate 10 and peripheral portions of the lower side substrate 20 are bonded through a bonding member of a framework shape such that the peripheral portions of the upper side substrate 10 and the peripheral portions of the lower side substrate 20 are spaced from each other by the determined distance d to seal the OCR 16 in the gap of the distance d between the upper side substrate 10 and the lower side substrate 20.

Figure 20:
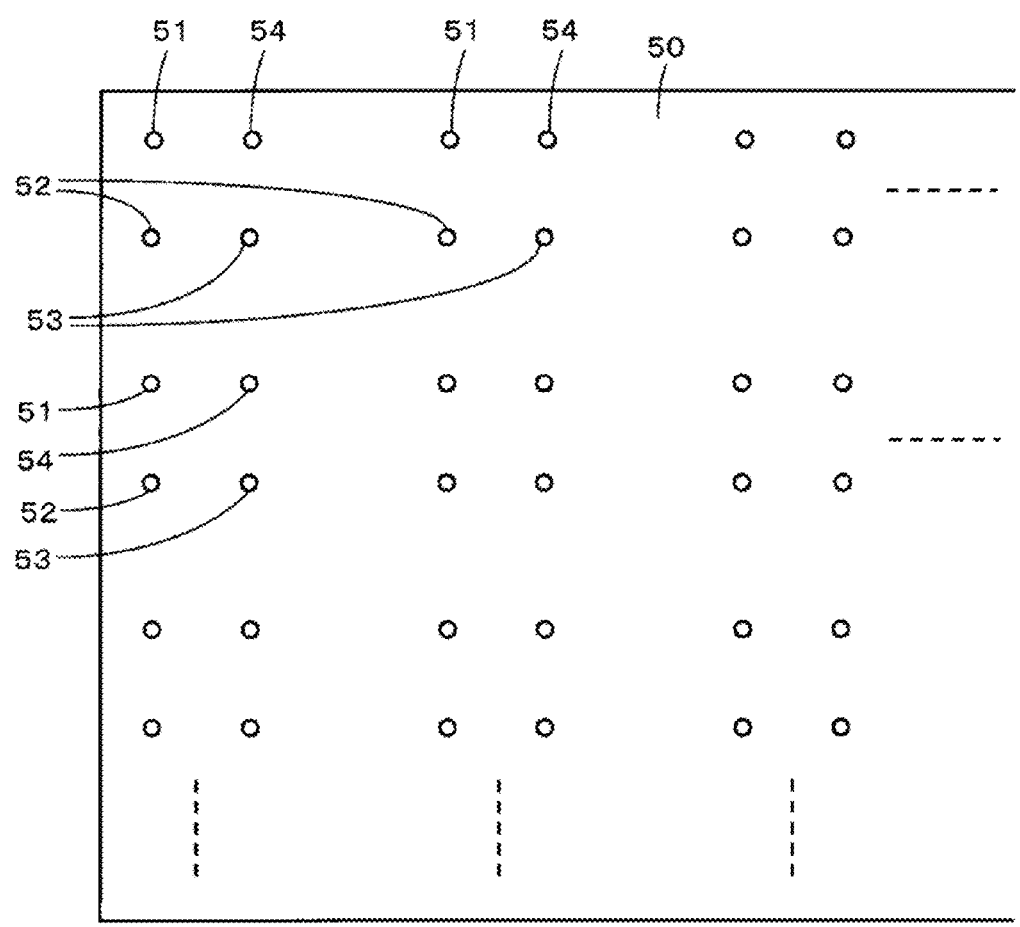
FIG. 20 is a view illustrating an embodiment of the pointer detection sensor.

Then, as shown in FIG. 20, a mask member 50 having through-holes 51 to 54 formed at positions thereof corresponding to the positions of all spacers Sa to Sd is disposed on the upper side substrate 10 in the pointer detection sensor 1B described hereinabove in the foregoing description of the first embodiment (refer to FIG. 19(C)). In this case, the mask member 50 is configured from a material which does not transmit ultraviolet rays UV there through.

Then, ultraviolet rays UV are irradiated through the through-holes 51 to 54 so that the portions of the OCR 16 on which the ultraviolet rays UV are irradiated through the through-holes 51 to 54 are cured as indicated by arrows in FIG. 19(C). In this case, the conditions relating to the cumulative amount of light, irradiation intensity, wavelength and so forth of the ultraviolet rays UV are selected suitably such that the height of the cured portions of the OCR 16 may be equal to the height of the spacers Sa to Sd described hereinabove.

Consequently, by removing the mask member 50, a pointer detection sensor 1B' of the second embodiment wherein spacers Sa' to Sd' corresponding to the spacers Sa to Sd described hereinabove are formed in central regions in the regions of cross points on the first conductors 11X is formed as depicted in FIG. 19(D).

The pointer detection sensor 1B' of the present second embodiment is different only in that a liquid layer of the OCR 16 is enclosed in place of the air layer in the gap between the first conductors 11X and the second conductors 21Y and that the spacers Sa' to Sd' are formed on the first conductors 11X. However, the pointer detection sensor 1B' of the present second embodiment exhibits working-effects quite similar to those exhibited by the pointer detection sensor 1B of the first embodiment described hereinabove.

It is to be noted that the OCR 16 at any other portion than the spacers Sa' to Sd' may not be left in the form of liquid but may be semi-cured into a gel state or a sol state.

Description of Second Fabrication Method

In the first fabrication method described above, the spacers are formed such that they extend from the above of ones of the first conductors formed on the upper side substrate 10 and the second conductors formed on the lower side substrate 20 so as to have a determined height spaced from the other ones of the first and second conductors. However, since the OCR comes to have a determined elasticity when it is cured, even if the spacers are formed so as to bridge the first conductors formed on the upper side substrate 10 and the second conductors formed on the lower side substrate 20, it can be expected that a characteristic similar to that achieved in the first embodiment described hereinabove can be achieved as a characteristic of the distance variation between the first conductors formed on the upper side substrate 10 and the second conductors formed on the lower side substrate 20 caused by pressing by a pointer.

An example of the second fabrication method is a case in which spacers are formed so as to bridge the first conductors formed on the upper side substrate 10 and the second conductors formed on the lower side substrate 20.

It is to be noted that, in the second fabrication method to be described below, the OCR 16 at any other portion than portions for the spacers to be cured fully is semi-cured into a gel state or a sol state. It is to be noted that, also in the present second fabrication method, the OCR 16 at any other portion than the portions for the spacers to be fully cured may remain in the form of liquid not cured.

First, similarly as in the first fabrication method described hereinabove, the upper side substrate 10 on which the first conductors 11X are formed and the lower side substrate 20 on which the second conductors 21Y are formed are placed such that, in a state in which the first conductors 11X and the second conductors 21Y extend perpendicularly to each other, the face of the upper side substrate 10 on which the first conductors 11X are formed and the face of the lower side substrate 20 on which the second conductors 21Y are formed are opposed to each other in a spaced relationship from each other by the determined distance d described hereinabove (refer to FIG. 21(A)).

Figure 21:
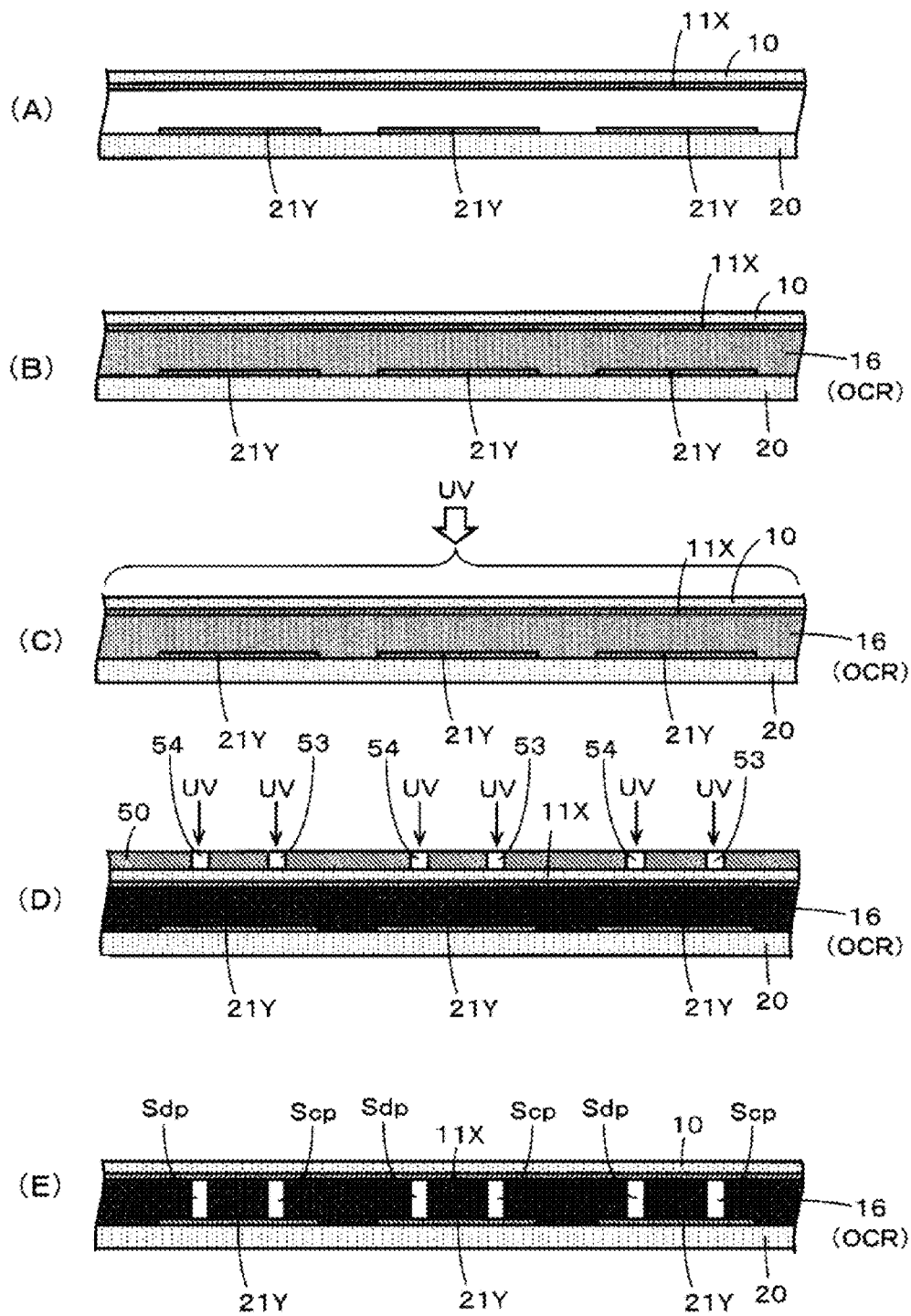
FIG. 21 is a view illustrating a second fabrication method of an embodiment of the pointer detection sensor.

Then, similarly as in the case of the first fabrication method, the OCR 16 in the state of liquid before curing is filled into and sealed in the gap of the distance d between the upper side substrate 10 on which the first conductors 11X are formed and the lower side substrate 20 on which the second conductors 21Y are formed (refer to FIG. 21(B)).

Then, in this state, ultraviolet rays UV are irradiated, for example, from the upper side substrate 10 side upon the OCR 16 until the OCR 16 is semi-cured into a gel state or a sol state (refer to FIG. 21(C)). In this case, the conditions relating to the cumulative light amount, irradiation intensity, wavelength and so forth of the ultraviolet rays UV are selected suitably so that the OCR 16 is semi-cured. In the gel state or sol state, the OCR 16 is not adhered to the upper side substrate 10 and the lower side substrate 20.

Then, the mask member 50 having the through-holes 51 to 54 formed at positions thereof corresponding to the positions of all spacers Sa to Sd as depicted in FIG. 20 is disposed on the upper side substrate 10 (refer to FIG. 21(D)).

Then, the ultraviolet rays UV are irradiated through the through-holes 51 to 54 as indicated by an arrow mark in FIG. 21(C) so that the portions of the OCR 16 upon which the ultraviolet rays UV are irradiated through the through-holes 51 to 54 are cured fully. Then, after the portions of the OCR 16 on which the ultraviolet rays UV are irradiated through the through-holes 51 to 54 are fully cured, the mask member 50 is removed.

Consequently, since the portions of the OCR 16 corresponding to the through-holes 51 to 54 are fully cured, spacers Sap to Sdp of a pillar shape are formed at the portions so as to bridge the first conductors 11X and the second conductors 21Y as depicted in FIG. 21(E). Then, the portions upon which the ultraviolet rays UV are not irradiated due to the presence of the mask member 50 remain in a gel state or a sol state.

The pillar-shaped spacers Sap to Sdp formed from the cured OCR have elasticity and are adhered to the first conductors 11X and the second conductors 21Y on the upper and lower sides at the opposite end portions of the pillars thereof. However, If pressing force P from a pointer is applied, then the OCR 16 at any other portion than the spacers Snp suffers from such a deflective variation as depicted in FIG. 22 because the OCR 16 remains in a gel state or a sol state and is in a state in which it is not adhered to the upper side substrate 10 and the lower side substrate 20.

Figure 22:
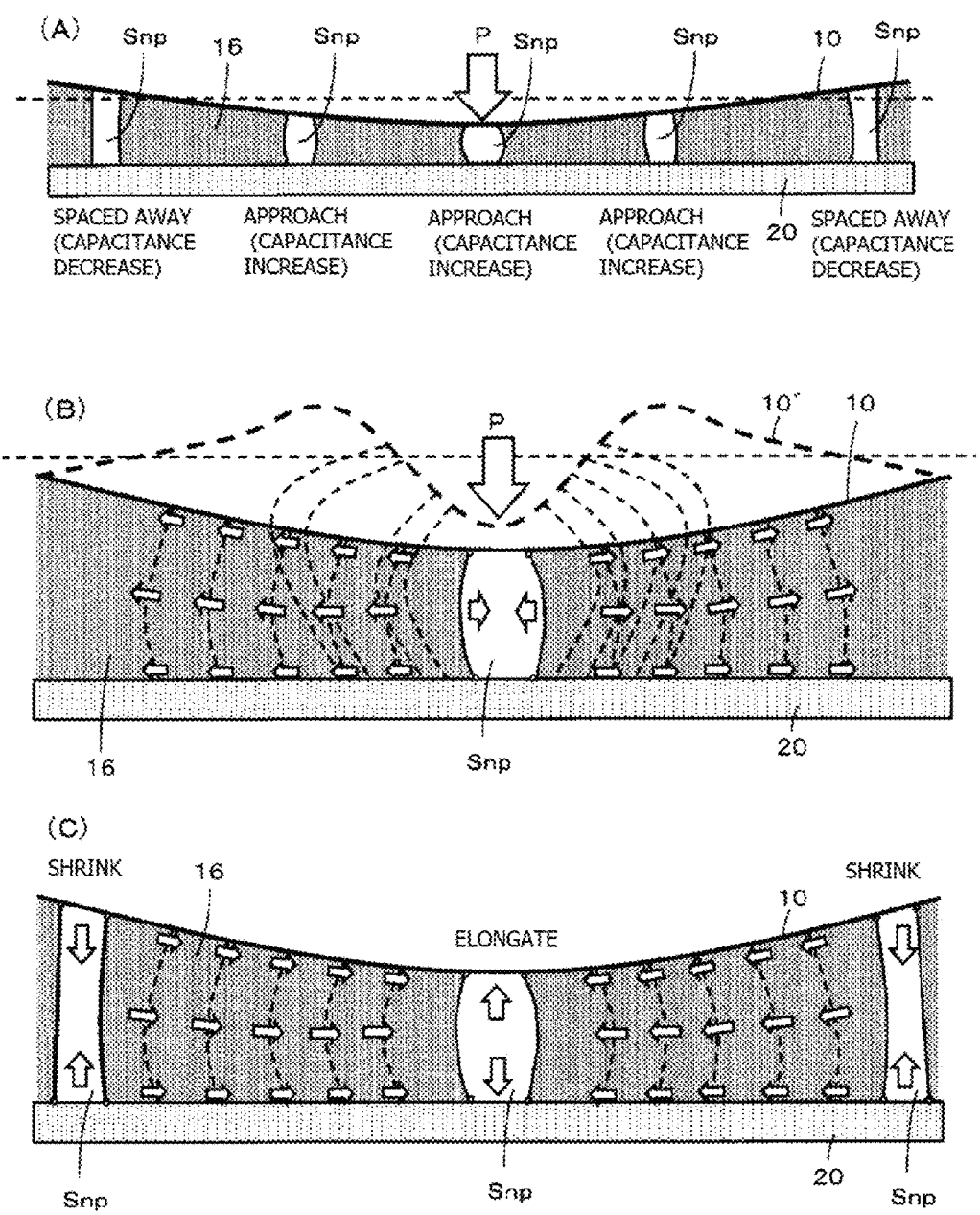
FIG. 22 is a view illustrating deflection of an upper side substrate when pressing force is applied from a pointer in an embodiment of the pointer detection sensor.

It is to be noted that FIG. 22 is a schematic view illustrating deflection by the pressing force P. In FIG. 22, a state in which pillar-shaped spacers Snp are formed between the thin upper side substrate 10 and the comparatively thick lower side substrate 20 is depicted. Since FIG. 22 is a schematic view, the first conductors 11X formed on the upper side substrate 10 and the second conductors 21Y formed on the lower side substrate 20 are omitted. Further, in FIG. 22(A), while the pillar-shaped spacers Snp are depicted as formed at equal distances for the convenience of illustration, actually the spacers Snp may be formed as the spacers Sap to Sdp only in the regions of the cross points as depicted in FIG. 21(E).

As depicted in FIG. 22(A), if the pressing force P is applied to the upper side substrate 10 above a spacer Snp by a pointer, then the upper side substrate 10 is deflected such that a periphery thereof around the pressed position is depressed widely. Then, to positions spaced from the pressed position (at positions of the left and right ends in FIG. 22(A)), the OCR in a state of gel or sol not cured flow. Therefore, the spacers Snp at the left and right ends are extended such that the upper side substrate 10 and the lower side substrate 20 are spaced away from each other in comparison with those in an initial state.

Then, if the pressing force P is removed in FIG. 22(A), then on the upper side substrate 10, the spacers Snp at the depressed portion tend to extend while the spacers Snp at the opposite left and right end portions which have been extended tend to shrink. Therefore, even if the OCR semi-cured into the state of gel or sol and poor in compressibility (elasticity) is interposed between the spacers Snp, the upper side substrate 10 restores an original state before the pressing. The deflective deformation described above is described further.

If the OCR 16 enclosed between the upper side substrate 10 and the lower side substrate 20 is entirely cured, then since all of the portions of the OCR 16 at which the OCR 16 contacts with the upper side substrate 10 and the lower side substrate 20 are adhered, even if the OCR 16 is pressed and depressed by the pressing force P, restoring force acts upon the OCR 16. Therefore, the upper side substrate 10 is not depressed unless it is pressed strongly. Further, since portions of the OCR 16 around the pressed and depressed portions of the OCR 16 are adhered to the upper side substrate 10 and the lower side substrate 20, the OCR 16 cannot move peripherally and displaces the upper side substrate 10 so as to raise a peripheral portion of the portion of the upper side substrate 10 to which the pressing force P is applied as indicated by a broken line 10' in FIG. 22(B).

In contrast, in the pointer detection sensor fabricated by the present second fabrication method, the OCR 16 at any other portion than the spacers Snp of a pillar shape is semi-cured and is not adhered also at portions at which it contacts with the upper side substrate 10 and the lower side substrate 20. Accordingly, the OCR 16 around the portion pressed and depressed by the pressing force P can flow readily as indicated by a small arrow mark in FIG. 22(B). Therefore, the upper side substrate 10 is deflected such that a peripheral portion of the position to which the pressing force P is applied is depressed widely as indicated by a solid line in FIG. 22(B).

Further, in the pointer detection sensor fabricated by the present second fabrication method, the OCR 16 enclosed between the upper side substrate 10 and the lower side substrate 20 exhibits such a state that a fully cured portion and a semi-cured portion appear alternately like [a fully cured portion of a spacer Snp]–[a semi-cured portion in a gel state or a sol state]–[a fully cured portion of another spacer Snp] as depicted in FIG. 22(A). Therefore, as depicted in FIG. 22(C), if the pressing force P is removed, then the force tending to extend the spacer Snp by elasticity of the same acts on the spacer Snp at the center in the pressed state while the force tending to shrink the spacer Snp acts on the spacers Snp on both sides. Therefore, even if a semi-cured portion is interposed between the spacers Snp, the deflected upper side substrate 10 returns to its original state more rapidly. In this case, the semi-cured portion returns to the original state rapidly by force acting to extend the spacer Snp at the center and force acting to shrink the spacer Snp at the opposite left and right ends as indicated by arrow marks in FIG. 22(C).

It is to be noted that, in the second fabrication method described above, it is a matter of course that portions of the OCR in the gap between the upper side substrate 10 and the lower side substrate 20 other than the portions corresponding to the spacers may not be OCR semi-cured into the state of gel or sol but remain in the form of liquid not cured. Also where not OCR which is semi-cured into a gel state or a sol state and has weak compressibility (weak elasticity) but uncured liquid of incompressibility (inelasticity) is interposed between the spacers Snp, it acts in a similar manner to that described hereinabove in regard to the deflective displacement when the pressing force P is applied to the upper side substrate 10.

As described above, according to the second embodiment, since not the air but OCR of a transparent elastic material is enclosed in the gap between the upper side substrate 10 and the lower side substrate 20, the optical characteristic can be improved.

Further, in the second embodiment, the spacers are formed by curing the OCR of a transparent elastic material from liquid. In particular, since the spacers and the liquid portions or the portions in a gel state or a sol state of the transparent elastic material other than the spacers are originally configured from the OCR of the same material, the boundary property change between the adjacent materials different in hardness (fully cured spacer portions and semi-cured portions or uncured liquid portions) exhibits a smooth transition, and also the modulus of elasticity and the refractive index exhibit a smooth transition. Therefore, there is an effect that a variation caused by a sudden change of a physical property on the boundary such as a sudden change in modulus of elasticity or reflection by a sudden change in refractive index is less likely to occur, the sudden change being likely to occur when the spacers and the liquid to be enclosed into the gap between the upper side substrate 10 and the lower side substrate 20 are configured from two different materials.

Further, in the second embodiment, the pointer detection sensor of the embodiment can be fabricated readily by laying out the states of the fully cured portions, the semi-cured portions or the uncured portions of the OCR on a plane using a mask member. Further, by laying out the states mentioned on a plane using a mask member and suitably selecting the conditions of the cumulative light amount, irradiation intensity, wavelength and so forth of the ultra-violet rays UV, an arbitrary variation amount corresponding to the pressing force P and the contacting area can be created and the feeling upon pressing can be made a desired one.

It is to be noted that, while the foregoing description of the second embodiment is directed to a case in which four spacers are provided at positions similar to those of the spacers Sa to Sd in the first embodiment in a central region in the region of each cross point of the pointer detection sensor, the first fabrication method and the second fabrication method of the second embodiment can be applied also to the other example of arrangement of the spacers and the other example of the shape of the spacers described as the modification to the first embodiment including also that exemplified in FIG. 18. In this case, it is a matter of course that the through-holes in the mask member are formed in a shape and a disposition layout conforming to the shape and the disposition layout of the spacers to be formed.

It is to be noted that also it is possible to use, as the UV-curable optical elastic resin to be enclosed between the first conductors 11X and the second conductors 21Y, an OCA (Optical Clear Adhesive) resin.

Third Embodiment

FIG. 23 is a view depicting an example of a configuration of a pointer detection sensor of a third embodiment, and same portions to those in the embodiments described above are denoted by same reference symbols. FIG. 23(B) is a view of the pointer detection sensor of the present third embodiment as viewed from the upper face (surface) side of an upper side substrate 10. FIG. 23(A) corresponds to a cross sectional view taken along line E-E of FIG. 23(B). Further, FIG. 23(C) is a view illustrating an effect of a configuration of the pointer detection sensor of the present third embodiment.

Also in the present third embodiment, similarly as in the embodiment described above, on a lower face of the upper side substrate 10 (face opposing to a lower side substrate 20), a plurality of first conductors 11X are formed so as to be arrayed at a determined array pitch in an X-axis direction and, on an upper face of the lower side substrate 20 (face opposing to the upper side substrate 10), a plurality of second conductors 21Y are formed so as to be arrayed at a determined array pitch in a Y-axis direction as depicted in FIGS. 23(A) and 23(B).

Further, in the present third embodiment, an elastic body 61 including a foamed body and configured from a non-adhesive and non-conductive dielectric material is provided between the upper side substrate 10 and the lower side substrate 20 as depicted in FIGS. 23(A) and 23(B). The elastic body 61 is configured from a polymer having elasticity such as, for example, foamed polyurethane. The reason why a non-adhesive bubble material is used for the elastic body 61 is to avoid a situation that, when bubbles collapse, adhesion occurs in the inside of the bubbles to disable elastic returning of the elastic body 61.

In this instance, through-holes 62 are formed in the elastic body 61 such that the through-holes 62 extend there through in a direction orthogonal to an upper face and a lower face of the upper side substrate 10 and the lower side substrate 20. In particular, the through-holes 62 are formed in regions which are other than the regions of cross points at which the first conductors 11X and the second conductors 21Y overlap with each other as viewed in a direction orthogonal to the upper face and the lower face of the upper side substrate 10 and the lower side substrate 20 and in which almost none of the first conductors 11X and the second conductors 21Y exist as depicted in FIG. 23(B).

Further, the elastic body 61 is provided between the upper side substrate 10 and the lower side substrate 20 such that it is bonded to the upper side substrate 10 by an adhesive 63 and bonded to the lower side substrate 20 by another adhesive 64. Accordingly, between the upper side substrate 10 and the lower side substrate 20, an air layer is interposed in the regions of the through-holes 62, and the elastic body 61 exists in the other regions than the regions of the through-holes 62. It is to be noted that, at the portions of the through-holes 62, gas of nitrogen or the like may be enclosed in place of the air.

The thickness of the elastic body 61 may be set to 300 μm or less when the detection sensitivity of the pointed position and the pressing force of the pointer detection sensor by a pointer and so forth are taken into consideration, and in the present example, the thickness is set to 100 μm including the adhesives 63 and 64. Further, while the elastic body 61 including a foamed body may be of an independent bubble type in which bubbles are independent of each other or a continuous bubble type in which bubbles are continuous to each other, the present example uses the elastic body 61 of the independent bubble type as depicted in FIG. 23(A). An elastic body of the independent bubble type has a characteristic that the responsiveness is very high. On the other hand, while an elastic body of the continuous bubble type is inferior in responsiveness in comparison with that of the independent bubble type, it has a characteristic that it is depressed more. As the elastic body 61 to be used in the pointer detection sensor of the third embodiment, an elastic body of any of the independent bubble type and the continuous bubble type can be used, and they can be used selectively in accordance with a necessary responsiveness and a necessary depression degree.

Although the through-holes 62 formed in the elastic body 61 may have an arbitrary shape, in the present example, they have a cylindrical shape especially having a circular cross section. Further, in the present example, the inner diameter of the through-holes 62 of the cylindrical shape is set to such a magnitude that the through-holes 62 extend to part of the first conductors 11X and the second conductors 21Y as depicted in FIG. 23(B).

However, there is no necessity to set the inner diameter of the through-holes 62 to such a magnitude that the through-holes 62 extend to part of the first conductors 11X and the second conductors 21Y as in the example described above, but the through-holes 62 may have an inner diameter with which they exist only within a region in which they do not overlap with any of the first conductors 11X and the second conductors 21Y as viewed in a direction orthogonal to the upper and lower faces of the upper side substrate 10 and the lower side substrate 20.

In this manner, in the third embodiment, even in a case in which the elastic body 61 is provided between the upper side substrate 10 and the lower side substrate 20 in place of the air layer, a peripheral portion of a position indicated by an arrow mark 65 in FIG. 23(C) which is spaced most from the region of the cross point at which the first conductor 11X and the second conductor 21Y overlap with each other is configured from gas such as air or nitrogen such that the upper side substrate 10 can be deformed by a great amount even with a low load and the deformation can reach the regions of cross points there around.

Further, by forming the cross section of the through-holes 62 in a circular shape, when the pressed position by a pointer is moved between the regions of cross points adjacent each other as indicated by an arrow mark 66 in FIG. 23(C), the area of the elastic body 61 gradually decreases toward a middle position between the regions of the adjacent cross points, and the elastic body 61 becomes liable to be depressed even with the same load. Then, after the pressed position by the pointer passes the middle position between the regions of the adjacent cross points, the area of the elastic body 61 gradually increases and also the depression amount by the pressing load returns to the original amount. In this manner, as the pressed position by the pointer moves away from the regions of the adjacent cross points, the elastic body 61 becomes liable to be depressed and smooth depression deformation can be caused.

Similarly, if the pressed position by the pointer is moved in an oblique direction above a through-hole 62 as indicated by an arrow mark 67 in FIG. 23(C), then since the distance between the through-hole 62 and the elastic body 61 exhibits a maximum value at a position at which the pressed position comes to the central position of the through-hole 62, as the pressed position approaches the central position, the depression amount increases even with the same load. Therefore, also in a region between the region of a cross point and the region of another cross point in which the detection sensitivity of the pointed position and the pressing force by the pointer of the pointer detection sensor is lowest, the influence of sufficient depression deformation can be provided to the regions of cross points there around. Therefore, also the influence upon the detection coordinate accuracy of the pointed position by the pointer can be minimized.

In the pointer detection sensor of the third embodiment described above, the upper side substrate 10 and the lower side substrate 20 are fixed by the adhesives 63 and 64 through the elastic body 61. Therefore, when the upper side substrate 10 returns from a state in which it is pressed by the pointer after the pressing is canceled, the upper side substrate 10 connected to the elastic body 61 through the adhesives 63 and 64 is stable in comparison with that in an alternative case in which gas such as air is interposed between the upper side substrate 10 and the lower side substrate 20, and vibration which is generated upon transition from application of pressing to cancellation of the pressing does not remain.

Further, since the pointer detection sensor of the third embodiment can create a uniform structure by bonding the elastic body 61 to the upper side substrate 10 and the lower side substrate 20 using the adhesives 63 and 64, the pointer detection sensor is small in dispersion and can be applied to a large size and allows stabilized sensor fabrication.

Further, since the elastic body 61 has a waterproof property, a waterproof effect can be exhibited for the first conductors 11X of the upper side substrate 10 and the second conductors 21Y of the lower side substrate 20. Therefore, the elastic body 61 has an effect also that it can be used in all-weather conditions.

Furthermore, where gas is provided between the upper side substrate 10 and the lower side substrate 20, a central portion of the pointer detection sensor is swollen like a dome by an atmospheric pressure variation or a temperature variation as depicted in FIG. 24(A), and the sensor sensitivity (detection sensitivity of the pointed position and the pressing force by a pointer) exhibits an increasing variation amount toward the center.

However, in the third embodiment, since the structure is adopted in which the upper side substrate 10 and the lower side substrate 20 are bonded through the elastic body 61 having the through-holes 62, the ratio of the gas between the upper side substrate 10 and the lower side substrate 20 decreases, and the variation in shape by an atmospheric pressure variation or a temperature variation occurs uniformly in the through-holes 62 and on the individual portions of the elastic body 61 over the overall pointer detection sensor as depicted in FIG. 24(B). Therefore, the phenomenon that a central portion of the pointer detection sensor is swollen like a dome does not occur, and the situation that the sensor sensitivity (detection sensitivity of the pointed position and the pressing force by the pointer) varies by an increasing amount toward the center does not occur.

Further, when gas in the through-holes 62 is expanded, since force acts in a direction in which the elastic body 61 is to shrink the gas in the through-holes 62 as indicated by arrow marks in FIG. 24(B), the shape is maintained while the upward and downward distance between the upper side substrate 10 and the lower side substrate 20 does not increase. Further, since the adhesives 63 and 64 themselves exert force in directions in which the upper side substrate 10 and the lower side substrate 20 are pushed (directions indicated by arrow marks in FIG. 24(B)), the initial sensitivity of the pointer detection sensor can be suppressed from being degraded.

Fourth Embodiment

FIG. 25 is a view depicting an example of a configuration of a pointer detection sensor of a fourth embodiment, and same portions to those in the embodiments described above are denoted by same reference symbols. FIG. 25(B) is a view of the pointer detection sensor of the fourth embodiment as viewed from an upper face (surface) side of an upper side substrate 10, and FIG. 25(A) corresponds to a cross sectional view taken along line F-F of FIG. 25(B). Further, FIG. 25(C) is a view illustrating another example of a configuration of the pointer detection sensor of the fourth embodiment and is a view as viewed from the upper face (surface) side of the upper side substrate 10.

Also in the present fourth embodiment, similarly as in the embodiment described above, on a lower face of the upper side substrate 10 (face opposing to a lower side substrate 20), a plurality of first conductors 11X are formed so as to be arrayed at a determined array pitch in an X-axis direction, and, on an upper face of the lower side substrate 20 (face opposing to the upper side substrate 10), a plurality of second conductors 21Y are formed so as to be arrayed at a determined array pitch in a Y axis direction as depicted in FIGS. 25(A) and 25(B).

Further, in the present fourth embodiment, an elastic body 61A including a foamed body and made of a non-adhesive and non-conductive dielectric material is provided between the upper side substrate 10 and the lower side substrate 20 similarly as in the third embodiment described hereinabove as depicted in FIGS. 25(A) and 25(B). The elastic body 61A is configured from a polymer having elasticity such as, for example, foamed polyurethane.

In this instance, through-holes 62A are formed in the elastic body 61A such that the through-holes 62A extend there through in a direction orthogonal to an upper face and a lower face of the upper side substrate 10 and the lower side substrate 20. In particular, the through-holes 62 are formed in regions overlapping with regions of cross points at which the first conductors 11X and the second conductors 21Y overlap with each other as viewed in a direction orthogonal to the upper face and the lower face of the upper side substrate 10 and the lower side substrate 20 as depicted in FIG. 25(B). Further, in the fourth embodiment, an elastic body is inserted in each of the through-holes 62A to form an elastic body pillar 68. The elastic material which configures the elastic body pillars 68 is configured from a non-conductive dielectric material including no foam, for example, from a resin having elasticity.

As depicted in FIG. 25(B), in the present example, the inner diameter of the through-holes 62A (diameter of the elastic body pillars 68) formed in the elastic body 61A is set to a magnitude with which an entire through-hole 62A is included in the region of a cross point. However, the inner diameter of the through-holes 62A (diameter of the elastic body pillars 68) is not limited to this example, but may have a magnitude with which the region of the cross point is entirely included in a through-hole 62A as depicted in FIG. 25(C). In short, only it is necessary for an elastic body pillar 68 to exist in the region of a cross point.

In the pointer detection sensor of the present fourth embodiment, the elastic body 61A is bonded to the face, on which the plurality of second conductors 21Y are formed, of the lower side substrate 20 on which the plurality of second conductors 21Y are formed, by an adhesive 64. Then, a material for configuring the elastic body pillar 68 is poured into the through-holes 62A of the elastic body 61A to form the elastic body pillars 68 in the through-holes 62A. Then, the face side of the upper side substrate 10 on which the plurality of first conductors 11X are formed is bonded to the elastic body pillars 68. In this case, in the present example, the upper side substrate 10 is bonded to the elastic body 61A by an elastic resin material configuring the elastic body pillars 68 as an adhesive.

Figure 26:
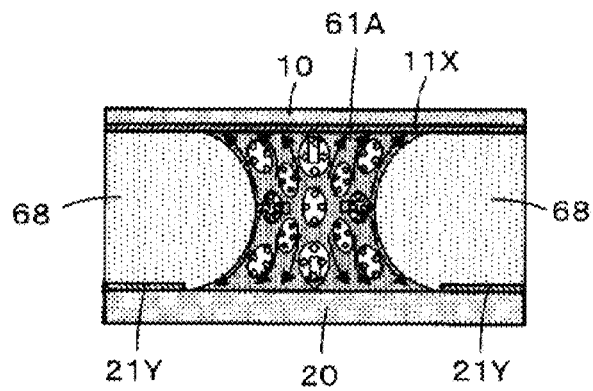
FIG. 26 is a view illustrating an effect of an embodiment of the pointer detection sensor.

In the pointer detection sensor of the present fourth embodiment, a very quick responsiveness to pressing by a pointer is obtained by the elastic force against pressing by the elastic body pillar 68 and repulsive force of the gas in the inside of the elastic body 61A including a foamed body. In particular, if the region of a cross point is pressed by a pointer to crush an elastic body pillar 68, then the elastic body pillar 68 is displaced so as to enter the elastic body 61A side including a surrounding foamed body as depicted in FIG. 26. Then, if the pressing force of the pointer is removed, then the pointer detection sensor returns to its original state by the elastic returning force of the elastic body pillars 68 themselves and the repulsive force of the gas in the inside of the elastic body 61A indicated by an arrow mark in the inside of the elastic body 61A including a foamed body in FIG. 26. Accordingly, a very quick responsiveness to pressing by a pointer can be obtained.

Since the dielectric material configuring the elastic body 61A including a foamed body includes many bubbles, the dielectric constant of the dielectric material approaches 1 which is equal to that of the gas as the bubbles increase. However, in the present fourth embodiment, since the elastic body pillars 68 having a dielectric constant higher than that of the gas exist in the region of a cross point, a dielectric constant higher than the dielectric constant of the gas=1, for example, a dielectric constant of 3 or more, can be assured as the dielectric constant in the region of the cross point. Consequently, the sensitivity of the pointer detection sensor (detection sensitivity of the pointed position and the pressing force by a pointer) can be improved.

Figure 27:
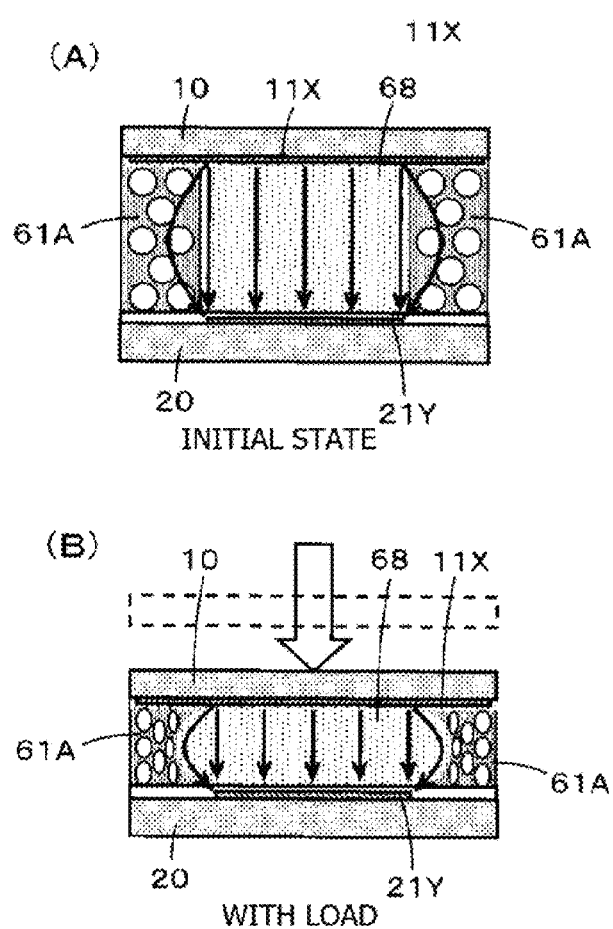
FIG. 27 is a view illustrating an effect of an embodiment of the pointer detection sensor.

In this case, in an initial state in which no pressing force is applied to the elastic body pillars 68, an electric field around the elastic body pillars 68 passes through the gas in the foamed body of the elastic body 61A as indicated by an arrow mark in FIG. 27(A). On the other hand, if the region of the cross point is pressed by a pointer to crush an elastic body pillar 68, then the elastic body pillar 68 enters the surrounding elastic body 61A side including a foamed body as depicted in FIG. 27(B) in such a manner as described above. In particular, the dielectric material configuring the elastic body pillar 68 advances into the route of the surrounding fringe electric field by the pressing load by the pointer in the region of the cross point. Therefore, in the region of the cross point, as the pressing load by the pointer increases, also an electric field around the elastic body pillar 68 passes through the elastic body pillar 68 more as indicated by an arrow mark in FIG. 27(B). The actual dielectric constant increases. In other words, the sensitivity variation upon application of a high load can be increased.

Other Embodiments or Modifications

While, in the first embodiment described hereinabove, the spacers are formed on the second conductors 21Y formed on the lower side substrate 20, they may otherwise be formed on the first conductors 11X formed on the upper side substrate 10. Further, while, in the first fabrication method of the second embodiment, the spacers are formed on the first conductors 11X formed on the upper side substrate 10, they may otherwise be formed on the second conductors 21Y formed on the lower side substrate 20. Further, while, in the second fabrication method of the second embodiment, ultraviolet rays are irradiated from the upper side substrate 10 side, they may otherwise be irradiated from the lower side substrate 20 side.

Further, while, in the embodiments described hereinabove, the conductors 11X disposed in the Y direction are determined as the first conductors formed on the upper side substrate 10 while the conductors 21Y disposed in the X direction are determined as the second conductors formed on the lower side substrate 20, the conductors 21Y disposed in the X direction may be determined as the first conductors formed on the upper side substrate 10 while the conductors 11X disposed in the Y direction are determined as the second conductors formed on the lower side substrate 20.

Further, the first conductors formed on the upper side substrate 10 and the second conductors formed on the lower side substrate 20 may not be disposed orthogonally to each other. Embodiments can be applied to a configuration in which, in order to generate regions of cross points, the first direction in which the first conductors are disposed and the second direction in which the second conductors are disposed cross with each other to generate regions of cross points.

Further, embodiments can be applied to a configuration in which the upper side substrate 10 and the lower side substrate 20 may have not a planar shape but a curved face shape with the substrates opposed to each other with a determined gap left there between.

It is to be noted that, since the embodiments described above are cases applied to an apparatus with a display function, although they adopt a configuration in which an LCD as an example of a display apparatus is provided, the pointer detection apparatus may have a configuration not including a display apparatus.

The invention claimed is:
1. A pointer detection sensor of a capacitance type, comprising:
  a plurality of first conductors disposed in a first direction;
  a plurality of second conductors disposed in a second direction crossing with the first direction, the plurality of first conductors and the plurality of second conductors disposed in an opposing relationship to each other and spaced apart from each other, wherein, in operation, a variation of a capacitance formed between any of the first conductors and any of the second conductors based on a variation of a distance between the first conductor and the second conductor when one of the first conductor and the second conductor is deflected by pressing by a pointer is detected to indicate a position pointed to by the pointer; and
  one or more spacers disposed only in regions of cross points between conductors of the plurality of first conductors and conductors of the plurality of second conductors, wherein the one or more spacers are interposed between conductors of the plurality of first conductors and conductors of the plurality of second conductors, and an amount of possible deflection of the first or second conductor toward the other in regions other than the regions of cross points is greater than in the regions of cross points.
2. The pointer detection sensor according to claim 1, wherein, in operation, a deflection amount of one of the first and second conductors in response to pressing by the pointer has a value higher in a region other than a cross point region than in a cross point region.

3. The pointer detection sensor according to claim 1, wherein the one or more spacers are positioned in central regions of the cross point regions.

4. The pointer detection sensor according to claim 1, wherein two or more spacers are formed in a central region of a cross point region.

5. The pointer detection sensor according to claim 3, wherein the central regions have a quadrangular shape, and spacers are positioned at each of four corners of the central regions of the quadrangular shape.

6. The pointer detection sensor according to claim 3, wherein the one or more spacers have a pillar shape and a single spacer is positioned in the central regions of each cross point region.

7. The pointer detection sensor according to claim 3, wherein lengths between the central regions in the regions of adjacent ones of the cross points in the first direction and the second direction are greater than lengths of the central regions in the region of the cross points in the first direction and the second direction.

8. The pointer detection sensor according to claim 1, wherein the one or more spacers are positioned on first conductors of respective cross points and have a height, which, in operation, maintains a space between the first conductor and the second conductor of the respective cross points.

9. The pointer detection sensor according to claim 1, wherein the one or more spacers are made of a hard material.

10. The pointer detection sensor according to claim 1, wherein the one or more spacers have elastic bodies.

11. The pointer detection sensor according to claim 10, wherein the one or more spacers bridge a first conductor and a second conductor of a respective cross point and are bonded to each of the first conductor and the second conductor of the respective cross point.

12. The pointer detection sensor according to claim 1, wherein transparent liquid is enclosed between the first conductor and the second conductor.

13. The pointer detection sensor according to claim 12, wherein
the transparent liquid comprises an ultraviolet-curable optical elastic resin, and
the one or more spacers comprise portions of the ultraviolet-curable optical elastic resin cured by irradiation of ultraviolet rays.

14. The pointer detection sensor according to claim 1, wherein the plurality of first conductors are positioned on a first substrate and the plurality of second conductors are positioned on a second substrate, and the first substrate and the second substrate are sealed at peripheral portions thereof by a member, the member maintaining a distance between the first conductors and the second conductors at the peripheral portions of the first and second substrates.

15. A pointer detection apparatus, comprising:
a pointer detection sensor of a capacitance type, having:
a plurality of first conductors disposed in a first direction;
a plurality of second conductors disposed in a second direction crossing with the first direction, the plurality of first conductors and the plurality of second conductors disposed in an opposing relationship to each other and spaced apart from each other, wherein, in operation, a variation of a capacitance formed between any of the first conductors and any of the second conductors based on a variation of a distance between the first conductor and the second conductor when one of the first conductor and the second conductor is deflected by pressing by a pointer is detected to indicate a position pointed to by the pointer; and
one or more spacers disposed only in regions of cross points between conductors of the plurality of first conductors and conductors of the plurality of second conductors;
an alternating current signal supplying circuit, which, in operation, supplies an alternating current signal to one or more of the plurality of first conductors; and
signal reception circuitry, which, in operation, determines a position pointed to by the pointer based on one or more signals received from the plurality of second conductors indicative of the variation of the capacitance in response to pressing corresponding to the position pointed to by the pointer.

16. The pointer detection apparatus according to claim 15, wherein the signal reception circuitry determines pressing force by the pointer based on the one or more signals indicative of the variation of the capacitance.

* * * * *